United States Patent
Ikeuchi et al.

(10) Patent No.: US 7,864,892 B2
(45) Date of Patent: Jan. 4, 2011

(54) CONTROL METHOD AND APPARATUS FOR RECEIVING OPTICAL SIGNAL

(75) Inventors: Tadashi Ikeuchi, Kawasaki (JP); Naoki Kuwata, Kawasaki (JP); Toru Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1070 days.

(21) Appl. No.: 11/606,067

(22) Filed: Nov. 30, 2006

(65) Prior Publication Data

US 2008/0019463 A1 Jan. 24, 2008

(30) Foreign Application Priority Data

Jul. 19, 2006 (JP) ............................. 2006-197198

(51) Int. Cl.
*H04L 27/22* (2006.01)
(52) U.S. Cl. ...................................... 375/329; 375/331
(58) Field of Classification Search ................. 375/329, 375/331
See application file for complete search history.

(56) References Cited

U.S. PATENT DOCUMENTS

| | | | | |
|---|---|---|---|---|
| 7,623,796 | B2 * | 11/2009 | Liu ............................. | 398/202 |
| 2006/0193640 | A1 * | 8/2006 | Katagiri et al. ............. | 398/188 |
| 2007/0047972 | A1 * | 3/2007 | Ikeuchi et al. ............... | 398/207 |
| 2007/0065157 | A1 * | 3/2007 | Katagiri et al. ............. | 398/155 |

FOREIGN PATENT DOCUMENTS

| | | |
|---|---|---|
| JP | 2004-516743 | 6/2004 |
| JP | 2004-533163 | 10/2004 |
| WO | 02/51041 A2 | 6/2002 |
| WO | 02/091660 A1 | 11/2002 |

OTHER PUBLICATIONS

P.S. Cho, et al., "Transmission of 25-Gb/s RZ-DQPSK Signals with 25-GHZ Channel Spacing Over 1000 km of SMF-28 Fiber," *IEEE Photonics Technology Letters*, vol. 15, No. 3, Mar. 2003, pp. 473-475.
H. Kim, et al., "Transmission of 8×20 Gb/s DQPSK Signals Over 310-km SMF with 0.8-b/s/Hz Spectral Efficiency," *IEEE Photonics Technology Letters*, vol. 15, No. 5, May 2003, pp. 769-771.
N. Yoshikane, et al., "1.14 b/s/Hz Spectrally-Efficient 50×85.4 Gb/s Transmission Over 300 km Using Copolarized CS-RZ DQPSK Signals," *Optical Society of America*, KDDI R&D Laboratories Inc., 2004, PDP38.

* cited by examiner

*Primary Examiner*—Shuwang Liu
*Assistant Examiner*—Michael R Neff
(74) *Attorney, Agent, or Firm*—Staas & Halsey LLP

(57) ABSTRACT

A receiving/processing unit receives signals parallelized by a parallelizing unit, and executes a frame process including frame synchronization process on the signals. A phase comparing circuit and a phase judging circuit judge whether a bit delay is present based on a phase difference between a phase of a clock signal at a clock/data recovering unit and a phase of a clock signal at the parallelizing unit. The receiving/processing unit includes a logic processing circuit that executes a bit delay process based on a result of judgment by the phase comparing circuit and the phase judging circuit.

13 Claims, 28 Drawing Sheets

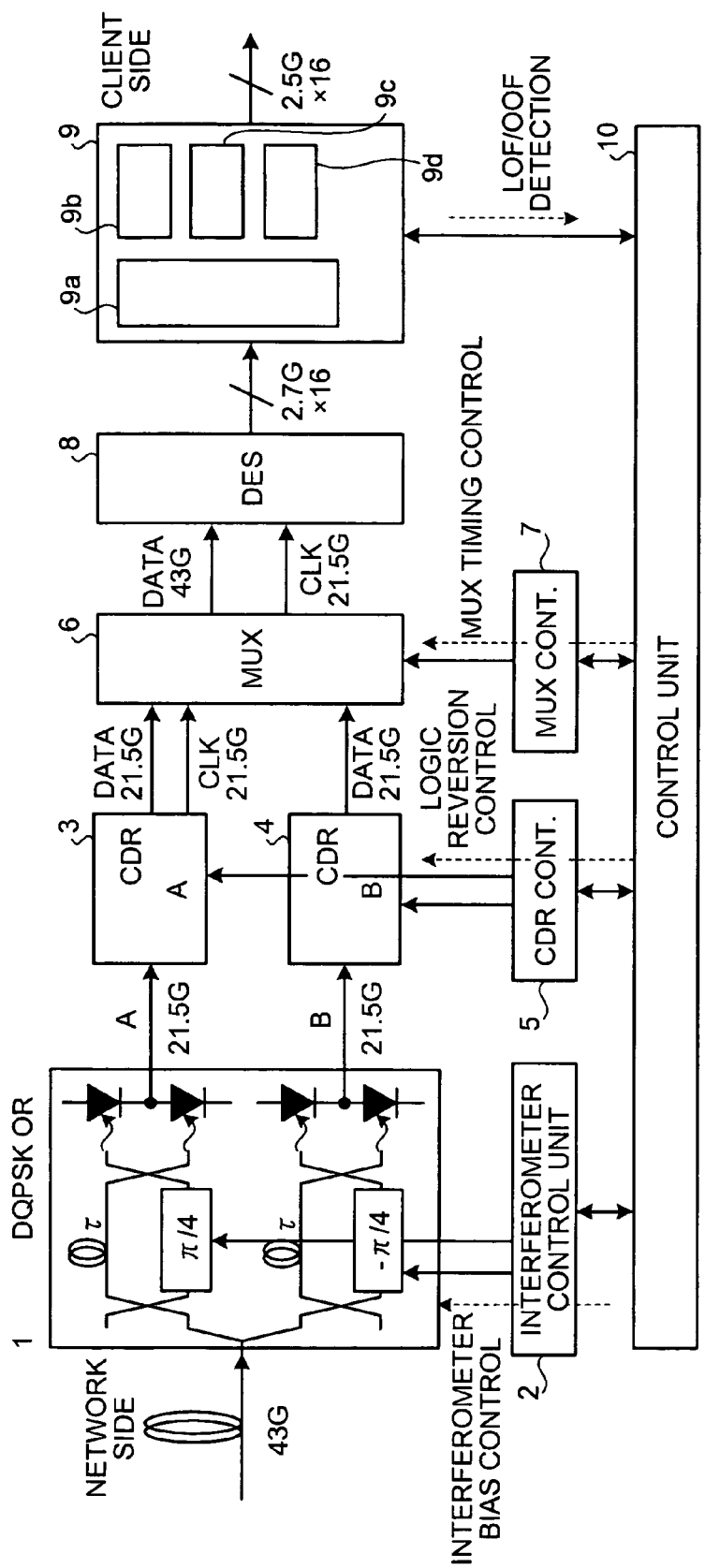

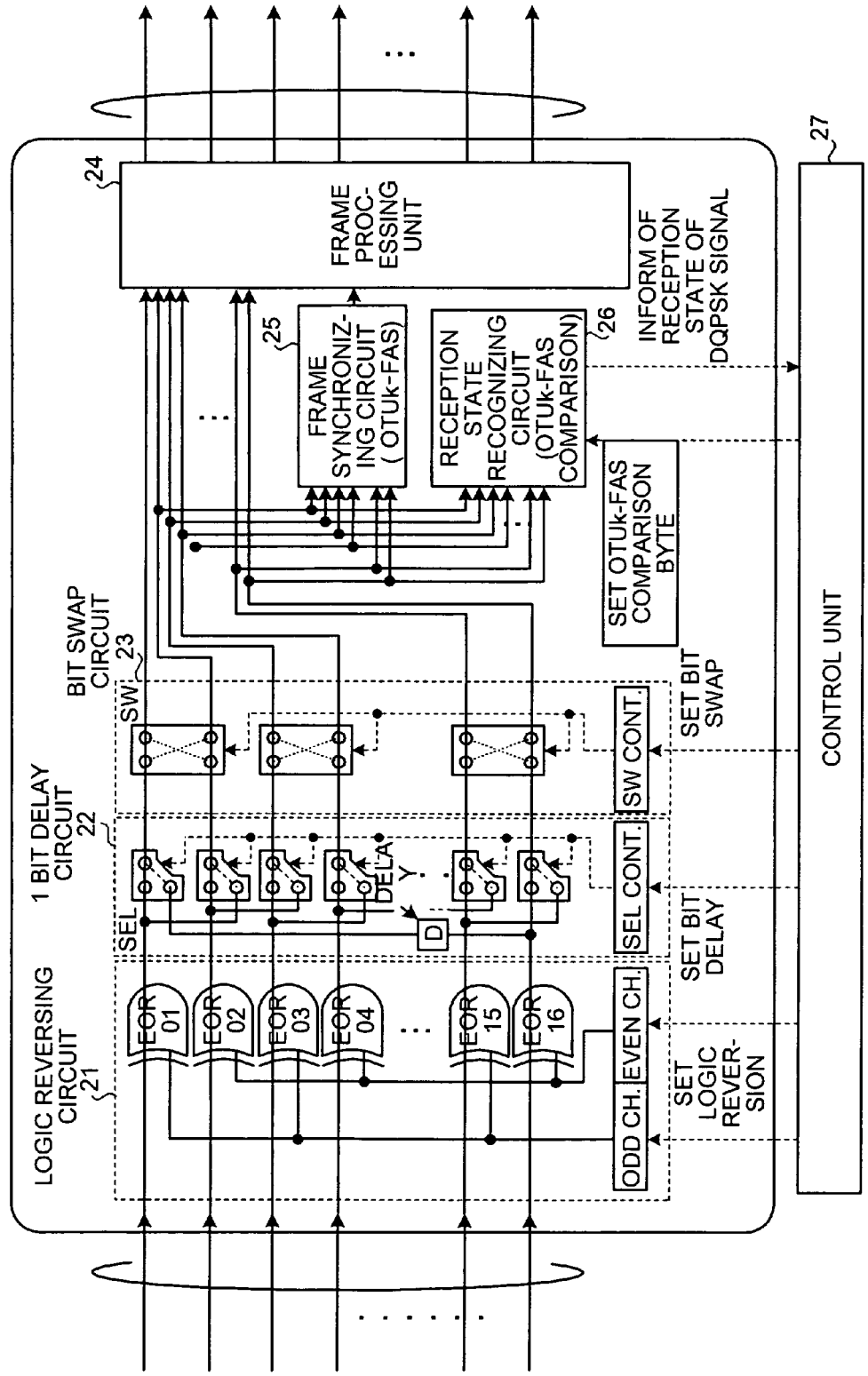

FIG.3

| ITEM NUMBER | DQPSK COMPARISON PATTERN (16 bits) | RECEPTION STATE (1) ||||||| RECEPTION STATE (2) |||||||
|---|---|---|---|---|---|---|---|---|---|---|---|---|---|---|---|
| | | RECEPTION STATE (ODD, EVEN) | STATE | LOGIC STATE CONTROL |||| | RECEPTION STATE (ODD, EVEN) | STATE | LOGIC STATE CONTROL ||||
| | | | | LOGIC REVERSION || BS | 1D | MZI | | | LOGIC REVERSION || BS | 1D | MZI |
| | | | | ODD | EVEN | | | | | | ODD | EVEN | | | |
| 1 | 1111 1100 0000 0000 | Qk,Qk | × | | | | | ✓ | Qk,Qk+1 | × | | | | | ✓ |
| 2 | 1010 1001 0101 0101 | Qk,Qk | × | | | | | ✓ | Q̄k,Qk+1 | × | | | | | ✓ |
| 3 | 1010 1100 0100 0001 | Qk,Ik | △ | | ✓ | ✓ | | | Ik,Qk+1 | △ | ✓ | | | | |
| 4 | 1111 1001 0001 0100 | Qk,Ik | ◇ | | ✓ | ✓ | | | Ik,Qk+1 | ◇ | ✓ | | | | |
| 5 | 0101 0110 1010 1010 | Q̄k,Qk | × | ✓ | | | | | Qk,Q̄k+1 | × | | | | | |
| 6 | 0000 0011 1111 1111 | Q̄k,Q̄k | × | ✓ | | | | | Q̄k,Q̄k+1 | × | | | | | |
| 7 | 0000 0110 1110 1011 | Q̄k,Ik | △ | ✓ | ✓ | ✓ | | | Ik,Q̄k+1 | △ | ✓ | ✓ | ✓ | | |
| 8 | 0101 0011 1011 1110 | Q̄k,Ik | △ | ✓ | ✓ | ✓ | | | Ik,Q̄k+1 | △ | ✓ | ✓ | ✓ | | |
| 9 | 0101 1100 1000 0010 | Ik,Qk | ○ | | | | | | Qk,Ik+1 | ○ | | | ✓ | ✓ | |
| 10 | 0000 1001 1101 0111 | Ik,Q̄k | ○ | | | | | | Q̄k,Ik+1 | ○ | | | ✓ | ✓ | |
| 11 | 0000 1100 1100 0011 | Ik,Ik | × | | | | | ✓ | Ik,Ik+1 | × | | | | | ✓ |
| 12 | 0101 1001 1001 0110 | Ik,Ik | × | | | | | ✓ | Ik,Ik+1 | × | | | | | ✓ |
| 13 | 1111 0110 0010 1000 | Ik,Qk | ⊚ | | | | | | Qk,Ik+1 | ⊚ | | | | | |
| 14 | 1010 0011 0111 1101 | Ik,Q̄k | ○ | | | | | | Q̄k,Ik+1 | ○ | | | | | |
| 15 | 1010 0110 0110 1001 | Ik,Ik | × | | | | | ✓ | Ik,Ik+1 | × | | | | | ✓ |
| 16 | 1111 0011 0011 1100 | Ik,Ik | × | | | | | ✓ | Ik,Ik+1 | × | | | | | ✓ |

BS: BIT SWAP CONTROL, 1D: BIT DELAY CONTROL, MZI: INTERFEROMETER CONTROL

FIG.5

| ITEM NUMBER | DQPSK COMPARISON PATTERN (16 bits) | RECEPTION STATE (1) | | | | | | RECEPTION STATE (2) | | | | | | |
|---|---|---|---|---|---|---|---|---|---|---|---|---|---|---|
| | | RECEPTION STATE (ODD, EVEN) | STATE | LOGIC STATE CONTROL | | | | RECEPTION STATE (ODD, EVEN) | STATE | LOGIC STATE CONTROL | | | | |
| | | | | LOGIC REVERSION | | BS | 1D | | | LOGIC REVERSION | | BS | 1D | |
| | | | | ODD | EVEN | | | | | ODD | EVEN | | | |
| 1 | 1010 1100 0100 0001 | Qk,Īk | △ | | | | | Īk,Qk+1 | △ | ✓ | | ✓ | ✓ |
| 2 | 1111 1001 0001 0110 | Qk,Ik | ◇ | | | | | Ik,Qk+1 | ◇ | ✓ | | ✓ | ✓ |
| 3 | 0000 0110 1110 1011 | Q̄k,Ik | △ | ✓ | ✓ | | | Ik,Q̄k+1 | △ | ✓ | ✓ | ✓ | ✓ |
| 4 | 0101 0011 1011 1110 | Q̄k,Īk | △ | ✓ | | | | Īk,Q̄k+1 | △ | | ✓ | ✓ | ✓ |
| 5 | 0101 1100 1000 0010 | Īk,Qk | ○ | ✓ | | | | Qk,Īk+1 | ○ | ✓ | | | |
| 6 | 0000 1001 1101 0111 | Ik,Qk | ○ | | ✓ | | | Q̄k,Īk+1 | ○ | | ✓ | | |
| 7 | 1111 0110 0010 1000 | Ik,Q̄k | ◎ | | ✓ | | | Qk,Ik+1 | ◎ | ✓ | | | |
| 8 | 1010 0011 0111 1101 | Īk,Q̄k | ○ | | | | | Q̄k,Ik+1 | ○ | | ✓ | | |

FIG.7

| ITEM NUMBER | DQPSK COMPARISON PATTERN (16 bits) | RECEPTION STATE (1) | | | | | RECEPTION STATE (2) | | | | |
|---|---|---|---|---|---|---|---|---|---|---|---|
| | | RECEPTION STATE (ODD, EVEN) | STATE | LOGIC STATE CONTROL | | | RECEPTION STATE (ODD, EVEN) | STATE | LOGIC STATE CONTROL | | |
| | | | | LOGIC REVERSION | | BS | ID | | | LOGIC REVERSION | | BS | ID |
| | | | | ODD | EVEN | | | | | ODD | EVEN | | |
| 1 | 1010 1100 0100 0001 | Qk,Īk | △ | ✓ | | ✓ | | Īk,Qk+1 | △ | ✓ | | ✓ | ✓ |
| 2 | 0101 0011 1011 1110 | Q̄k,Ik | △ | ✓ | ✓ | ✓ | | Ik,Q̄k+1 | △ | ✓ | ✓ | ✓ | ✓ |
| 3 | 0000 1001 1101 0111 | Īk,Q̄k | ○ | | | | | Q̄k,Īk+1 | ○ | | | | |
| 4 | 1111 0110 0010 1000 | Ik,Qk | ◎ | | | | | Qk,Ik+1 | ◎ | | | | |

FIG.9

| ITEM NUMBER | DQPSK COMPARISON PATTERN (16 bits) | RECEPTION STATE (1) | | | | | | RECEPTION STATE (3) | | | | | |
|---|---|---|---|---|---|---|---|---|---|---|---|---|---|
| | | RECEPTION STATE (ODD, EVEN) | STATE | LOGIC REVERSION | | LOGIC STATE CONTROL | | RECEPTION STATE (ODD, EVEN) | STATE | LOGIC REVERSION | | LOGIC STATE CONTROL | |
| | | | | ODD | EVEN | BS | 1D | | | ODD | EVEN | BS | 1D |
| 1 | 1010 1100 0100 0001 | Qk,Ik̄ | △ | | | | | Īk,Qk+1 | △ | | | | ✓ |
| 2 | 1111 1001 0001 0110 | Qk,Ik | ◇ | | | | | Ik,Qk+1 | ◇ | | | | ✓ |
| 3 | 0000 0110 1110 1011 | Q̄k,Ik | △ | ✓ | ✓ | ✓ | | Īk,Qk+1 | △ | ✓ | | ✓ | ✓ |
| 4 | 0101 0011 1011 1110 | Q̄k,Īk | △ | ✓ | | ✓ | | Ik,Q̄k+1 | △ | ✓ | | ✓ | ✓ |
| 5 | 0101 1100 1000 0010 | Īk,Qk | ○ | ✓ | | | | Qk,Īk+1 | ○ | ✓ | | | ✓ |
| 6 | 0000 1001 1101 0111 | Īk,Q̄k | ○ | | ✓ | | | Q̄k,Īk+1 | ○ | | | | ✓ |
| 7 | 1111 0110 0010 1000 | Ik,Q̄k | ◎ | | ✓ | ✓ | | Qk,Ik+1 | ◎ | | ✓ | | ✓ |
| 8 | 1010 0011 0111 1101 | Ik,Qk | ○ | | | ✓ | | Q̄k,Ik+1 | ○ | | ✓ | | ✓ |

FIG.27

(a) DQPSK SIGNAL RECEPTION STATE OF INTERFEROMETER+O/E OUTPUT

|  |  | O/E A ch. OUTPUT | | | |
|---|---|---|---|---|---|
|  |  | Qk | $\overline{Qk}$ | $\overline{Ik}$ | Ik |
| O/E B ch. OUTPUT | Qk | × | × | ○ | ◎ |
|  | $\overline{Qk}$ | × | × | ○ | ○ |
|  | $\overline{Ik}$ | △ | △ | × | × |
|  | Ik | ◇ | △ | × | × |

(b) DQPSK SIGNAL RECEPTION STATE (1) AT SFI-5 INTERFACE (CASE 1 & 2)

|  |  | SFI5 ODD Ch. OUTPUT | | | |
|---|---|---|---|---|---|
|  |  | Qk | $\overline{Qk}$ | $\overline{Ik}$ | Ik |
| SFI5 EVEN Ch. OUTPUT | Qk | × | × | ○ | ◎ |
|  | $\overline{Qk}$ | × | × | ○ | ○ |
|  | $\overline{Ik}$ | △ | △ | × | × |
|  | Ik | ◇ | △ | × | × |

(c) DQPSK SIGNAL RECEPTION STATE (2) AT SFI-5 INTERFACE (CASE 3 & 4)

|  |  | SFI5 ODD Ch. OUTPUT | | | |
|---|---|---|---|---|---|
|  |  | Qk | $\overline{Qk}$ | $\overline{Ik}$ | $\overline{Ik}$ |
| SFI5 EVEN Ch. OUTPUT | Qk+1 | × | × | △ | ◇ |
|  | $\overline{Qk+1}$ | × | × | △ | △ |
|  | $\overline{Ik+1}$ | ○ | ○ | × | × |
|  | Ik+1 | ◎ | ○ | × | × |

US 7,864,892 B2

CONTROL METHOD AND APPARATUS FOR RECEIVING OPTICAL SIGNAL

CROSS-REFERENCE TO RELATED APPLICATIONS

This application is based upon and claims the benefit of priority from the prior Japanese Patent Application No. 2006-197198, filed on Jul. 19, 2006, the entire contents of which are incorporated herein by reference.

BACKGROUND OF THE INVENTION

1. Field of the Invention

The present invention relates to a technology of receiving an optical signal in optical data communication by differential quadrature phase shift keying (DQPSK) modulation.

2. Description of the Related Art

In the use of data communication systems in recent years, which is typified by the Internet, a communication system to meet growing demands for data communication has been studied. An optical communication system employing intensity modulation differential quadrature phase shift keying (IM-DQPSK) has been considered as such a communication system that improves frequency use efficiency. Such a technology is described in, for example, IEEE Photon. Technol. Lett., vol. 15, pp. 473-475, March 2003, titled "Transmission of 25-Gb/S RZ-DQPSK signals with 25-GHz channel spacing over 1000 km of SMF-28 fiber", by P. S. Cho, V. S. Grioryan, Y. A. Godin, A. Salamon, and Y. Achiam, IEEE Photon. Technol. Lett., vol. 15, pp. 769-771, May 2003, titled "Transmission of 8×20 Gb/S DQPSK signals with 25-GHz channel spacing over 310 km SMF with 0.8 b/s/Hz spectral efficiency" by H. Kim, and R-J. Essiambre, and Technical Digest of OF2004, postdeadline paper, PDP 38) titled "1.14 b/s/Hz spectrally efficient 50×85.4 Gb/s transmission over 300 km using copolarized CS-RZ DQPSK signals" by N. Yoshikane and I. Morita.

FIG. 25 depicts a conventional optical signal transceiver (optical transponder) employing IM-DQPSK. As shown in FIG. 25, the optical signal transceiver includes a framer (framer-LSI) 100, an optical receiving unit (40 GOR) 101, a serializing unit (SER) 102, a demultiplexing unit (DEMUX) 103, a precoder (DQPSK precoder) 104, a DQPSK modulating unit (40G DQPSK OS) 105, an optical transmitting unit (40G OS) 106, a parallelizing unit (DES) 107, a multiplexing unit (MUX) 108, and a receiving/demodulating unit (40G DQPSK OR) 109.

The DQPSK modulating unit 105, of which the outline internal structure is shown above in FIG. 25, has a distribution feedback semiconductor laser (DFB-LD) 111, a phase modulator 112, an intensity modulator 113, and drivers. The phase modulator 112 includes phase modulators 114, 115, and a $\pi/2$ phase shifting unit. The receiving/demodulating unit 109, of which the outline internal structure is shown below in FIG. 25, has a $\pi/4$ delay interferometer 116, a $-\pi/4$ delay interferometer 117, photodiodes (PD), which are photoelectric conversion elements, and an amplifier (amp).

When data of 40 Gb/s is converted into an optical signal, and is modulated by DQPSK for transmission/reception, an optical signal from the client side is received by the optical receiving unit 101, where the signal is converted into an electrical signal and is also parallelized into 16 parallel signals (2.5 Gb/s×16=40 Gb/s) that are then put into the framer 100. The "b/s" expressing the unit of transfer rate is omitted from FIG. 25. The framer 100 has a function of executing a mapping process and a demapping process on a frame conforming to a transmission method of synchronous optical network (SONET), synchronous digital hierarchy (SDH), optical transport network (OTN), etc., using converted 16 parallel data.

A frame process by the framer 100 produces parallel data of 2.7 Gb/s×16, which is serialized by the serializing unit 102 into serial data of 43 Gb/s. The serial data and a clock signal of 21.5 Gb/s are put into the demultiplexing unit 103, where the input data is demultiplexed into signals lk, Qk of 21.5 Gb/S at the ratio of 1:2. The signals lk, Qk are then put into the precoder 104 that converts the input signals into signals ηk, ρk according to a given logic, and puts the signals ηk, ρk into the DQPSK modulating unit 105.

The precoder 104 converts the input in-phase signals lk and quadrature signals Qk into the signals ηk, ρk, as described above. The precoder 104 is composed of a logic gate circuit that is a combination of OR circuits, AND circuits, inhibit circuits, etc. The signals ηk, ρk converted by the precoder 104 (21.5G data) are put into the DQPSK modulating unit 105, where the signals ηk, ρk are converted into a DQPSK optical signal, and is sent out to the network side. In the DQPSK modulating unit 105, output light from the distribution feedback semiconductor laser 111 is divided into two branches of light. One branch of light is put into the phase modulator 114, and the other branch of light is shifted in phase by $\pi/2$ and is put into the phase modulator 115. Both branches of light are modulated in phase according to the signals ηk, ρk of 21.5 Gb/S from the precoder 104, and synthesized, then put into the intensity modulator 113, which modulates the input signal in intensity using a clock signal of 21.5 GHz, and sends out the modulated signal as an IM-DQPSK signal of 43 Gb/s. Generally, the phase modulators 114, 115 and the intensity modulator 113 in the DQPSK modulating unit 105 each includes, for example, a Mach-Zehnder interferometer composed of electro-optical effect elements made of $LiNbO_3$, etc.

A DQPSK optical signal from the network side is put into the receiving/demodulating unit 109, where the input optical signal is divided into two branched optical signals. On branched signal is put into the $\pi/4$ delay interferometer 116, and the other branched signal is put into the $-\pi/4$ delay interferometer 117. Each delay interferometer 116, 117 has two optical waveguides offering different lengths of light paths, which give the input modulated optical signal a delay τ equivalent to one symbol of the signal. The delay interferometer 116 has a $\pi/4$ phase unit on an arm, and the delay interferometer 117 has a $-\pi/4$ phase unit on an arm. The optical signal from the arm of each delay interferometer 116, 117 is put into a pair of light-receiving elements (PD) via an output side coupler. The light-receiving elements convert the optical signals photoelectrically, after which the delay interferometer 116 puts out an in-phase signal lk, and the delay interferometer 117 puts out quadrature signal Qk.

The multiplexing unit 108 multiplexes the signals lk, Qk of 21.5 Gb/s from the receiving/demodulating unit 109, and puts the multiplexed signals of 43 Gb/s and a clock signal of 21.5 Gb/s into the parallelizing unit 107, which parallelizes the input signals into parallel signals of 2.7 Gb/s×16, and puts the parallel signals into the framer 100. The framer 100 puts parallel signals of 2.5 Gb/s×16, which are demapped from a frame conforming to the transmission method of SONET, SDH, OTU, etc., into the optical transmitting unit 106, which serializes the input signals, converts the serialized signals into optical signal of 40 Gb/s, and sends the optical signal to the client side. While the parallelizing unit 107 parallelizes input signals into parallel signals of 2.7 Gb/s×16 and the signals are then processed in the framer 100 in the same parallel signal number of 2.7 Gb/s×16 after the parallelization, the parallel signal number after the parallelization may be a different parallel signal number of, for example, 10.4 Gb/s×16, thus the process in the framer 100 may be executed in the same parallel signal number of 10.4 Gb/s×16.

Such an optical communication system is proposed that employs a Mach-Zehnder interferometer as optical signal modulating and demodulating units operated by DMPSK with phase number M=2n. When n=2, the modulating and demodulating units in this system becomes the same as the one described above that are operated by DQPSK (for example, Japanese Patent Application No. 2004-516743). Another known optical signal communication system is such that a phase modulated optical signal is modulated in intensity by a clock signal, and is transmitted to the reception side, where the clock signal is reproduced based on an intensity modulation element (for example, Japanese Patent Application No. 2004-533163).

FIG. 26 depicts a structure of main units at the optical signal transmission and reception sides in the structure of the optical signal transceiver shown in FIG. 25. 121 denotes a transmitting/processing unit (OTN LSI), 122 denotes an optical modulation processing unit (43G NB Mod (Rx side)), 123 denotes an optical signal receiving/processing unit, and 124 denotes an receiving/processing unit (OTN LSI). An SFI-5 interface conforms to 40 Gb/s serdes framer interface standard specified by optical interface forum (OIF) standard OIF-SFI5-01.02. The SFI-5 interface is a parallel signal interface that connects the transmitting/processing unit 121 to the optical modulation processing unit 122, and that connects the optical signal receiving/processing unit 123 to the receiving/processing unit 124. The type of the interface connecting the transmitting/processing unit 121 to the optical modulation processing unit 122 and connecting the optical signal receiving/processing unit 123 to the receiving/processing unit 124 is not limited to SFI-5, but another type of a signal interface equivalent to the SFI-5 interface may be employed.

The transmitting/processing unit 121 includes the framer 100. The optical modulation processing unit 122 includes the serializing unit SER, the demultiplexing unit 1:2 DMUX, drivers that puts data ηk, ρk that are separated by the demultiplexing unit 1:2 DMUX, into the phase modulator to control the phase modulator, the distribution feedback semiconductor laser DFG-LD, the phase modulator, and the intensity modulator. An intensity modulated DQPSK signal output from the intensity modulator (e.g., IM-DQPSK signal including carrier suppressed return-to-zero (CSRZ)-DQPSK signal and return-to-zero (RZ)-DQPSK signal) is transmitted in the from of $\{Ik, Qk\}$, $\{IK+1, Qk+1\}$ . . . , which is expressed as kth data, (k+1)th data, (K+2)th data . . . on the time axis. In other words, one symbol of the IM-DQPSK optical signal includes two bits data represented as $\{Ik, Qk\}$, $\{IK+1, Qk+1\}$ . . . .

The optical signal receiving/processing unit 123 includes the π/4 and/−π/4 delay interferometers, photoelectric conversion elements PD, amplifiers amp, the multiplexing unit CDR+2:1 MUX that performs clock/data recovery and data multiplexing, and the parallelizing unit De-serializer. This configuration is equivalent to the configuration shown in FIG. 25 that includes the π/4 and −π/4 delay interferometers 116, 117, photoelectric conversion elements PD, amplifiers amp, the multiplexing unit 108, and the parallelizing unit 107. The clock/data recovering and multiplexing unit CDR+2:1 MUX and the parallelizing unit De-serializer are each provided as an integrated circuit. The receiving/processing unit 124 is equivalent to the framer 100 and the optical transmitting unit 106 shown in FIG. 25.

In the optical signal receiving/processing unit 123, photoelectrically converted signals Ak, Ak+1 . . . from the π/4 delay interferometer and photoelectrically converted signals Bk, Bk+1 . . . from the −π/4 delay interferometer are multiplex at the clock/data recovering and multiplexing unit CDR+2:1 MUX into signals in the form of Ak, Bk, Ak+1 . . . . The multiplexed signals are transferred to the parallelizing unit De-serializer, which converts the received signals into 16 parallel signals, and transfers the parallel signals to the receiving/processing unit 124 including the framer (see FIG. 25) via the SFI-5 interface. The order of arrangement of the parallelized 16 signals transferred to the receiving/processing unit 124 is either a combination of Case 1 and a Case 2 or of a Case 3 and a Case 4 selected from Cases 1, 2, 3, 4, according to parallelization timing.

FIG. 27 depicts reception states when signal are in states of (a), (b), (C) shown in FIG. 26. FIG. 27A depicts a reception state of signals at the A channel (Ach) and the B channel (Bch) of the optical signal receiving/processing unit 123 under various conditions. This signal reception is carried out on the assumption that a π/2 phase shifter included in the phase modulator in the optical signal transmitting unit 122 shown in FIG. 26 is capable of keeping a phase difference between an in-phase signal and a quadrature signal at π/2. In FIG. 27A, a double circle mark represents a desired reception state, and a circle mark indicates that a signal either at the A channel or B channel is logically reversed to a signal in the desired reception state. A triangular mark indicates that a received signal is in a state of logical reversion and bit swap, and a diamond mark indicates a signal in a state of bit swap. A cross mark indicates that both A and B channels put out the in-phase elements or transverse elements of a DQPSK signal, which means a condition where such a reception process as synchronized data capturing is impossible.

FIG. 27 depicts a reception state at the 16 parallel signal interface between the parallelizing unit of the optical signal receiving/processing unit 123 and the receiving/processing unit 124. Photoelectric conversion, clock/data recovery, and multiplexing performed in the optical signal receiving/processing unit 123 and signal arrangement by the parallelizing unit produce parallel signals ordered in the arrangements of any one of the Case 1 to Case 4. The Cases 3, 4 represent the arrangement of signals that the signals are shifted by one bit against the signals in the arrangement of the Cases 1, 2. Because of this, the signals arranged as the Cases 1, 2 are received in the reception state illustrated in FIG. 27B, while the signals arranged as the Cases 3, 4 are received in the reception state illustrated in FIG. 27C. In this case, as in the case of FIG. 27A, signal reception occurs in each reception state marked with a circle, triangular, diamond, cross, and double circle that represents a desired reception state.

As described above, a desired reception state marked with a double circle enables a normal optical signal reception process, thus allowing the establishment of frame synchronization. Signal reception occurring in a state other than the desired state, however, renders synchronous frame capturing impossible, thus makes the normal reception process impossible. Even if the optical signal receiving/processing unit 123 is set to a desirable reception state by setting the function of each unit of the signal receiving/processing unit 123 in detail at the initial startup, secular change or temperature change may changes the operational state of each unit, which requires resetting. Even if a reception state at the optical signal receiving/processing unit 123 is determined to become the state illustrated in FIG. 27A, the 16 parallel signal interface between the optical signal receiving/processing unit 123 and the receiving/processing unit 124 shows two possible reception states illustrated in FIGS. 27B and 27C.

SUMMARY OF THE INVENTION

It is an object of the present invention to solve at least the above problems in the conventional technologies.

An apparatus according to one aspect of the present invention is for receiving an optical signal that receives and demodulates an optical signal subjected to differential quadrature phase shift keying (DQPSK) modulation. The apparatus includes a demodulating unit that includes a plurality of delay interferometers and photoelectric conversion elements, the interferometers and the photoelectric conversion elements converting an in-phase signal and a quadrature signal of a DQPSK optical signal into electrical signals of each; a recovering unit that recovers a clock signal and data based on the electrical signals; a multiplexing unit that multiplexes the electrical signals from the recovering unit; a parallelizing unit that parallelizes the signals multiplexed by the multiplexing unit; a processing unit that performs a frame process including a frame synchronization process on the signals parallelized by the parallelizing unit; and a judging unit that judges whether a bit delay is present based on a phase difference between a phase of the clock signal at the recovering unit and a phase of the clock signal at the parallelizing unit. The processing unit includes a logic processing circuit that executes a bit delay process according to a result of judgment by the judging unit.

A control method according to another aspect of the present invention is of receiving and demodulating an optical signal subjected to DQPSK modulation. The method includes receiving the optical signal; converting an in-phase signal and a quadrature signal of the optical signal into electrical signals of each; multiplexing the electrical signals; parallelizing the multiplexed signals by a parallelizing unit; judging whether a bit delay is present at the parallelizing unit; and recognizing a reception state by comparing the parallelized signals with comparison patterns; performing any one of a logic reversion process, a bit delay process, and a bit swap process corresponding to a reception state other than a desired reception state based on a result of judgment at the judging. One of the processes performed is repeated until frame synchronization is established.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is an explanatory diagram of a first embodiment of the present invention;

FIG. 2 is an explanatory diagram of a main unit of the first embodiment;

FIG. 3 is an explanatory diagram of reception states and controls according to the first embodiment;

FIG. 5 is an explanatory diagram of reception states and controls according to the second embodiment;

FIG. 7 is an explanatory diagram of reception states and controls according to the third embodiment;

FIG. 9 is an explanatory diagram of reception states and controls according to the fourth embodiment;

FIG. 27 is an explanatory diagram of reception states.

DETAILED DESCRIPTION OF THE PREFERRED EMBODIMENTS

Figure 4:
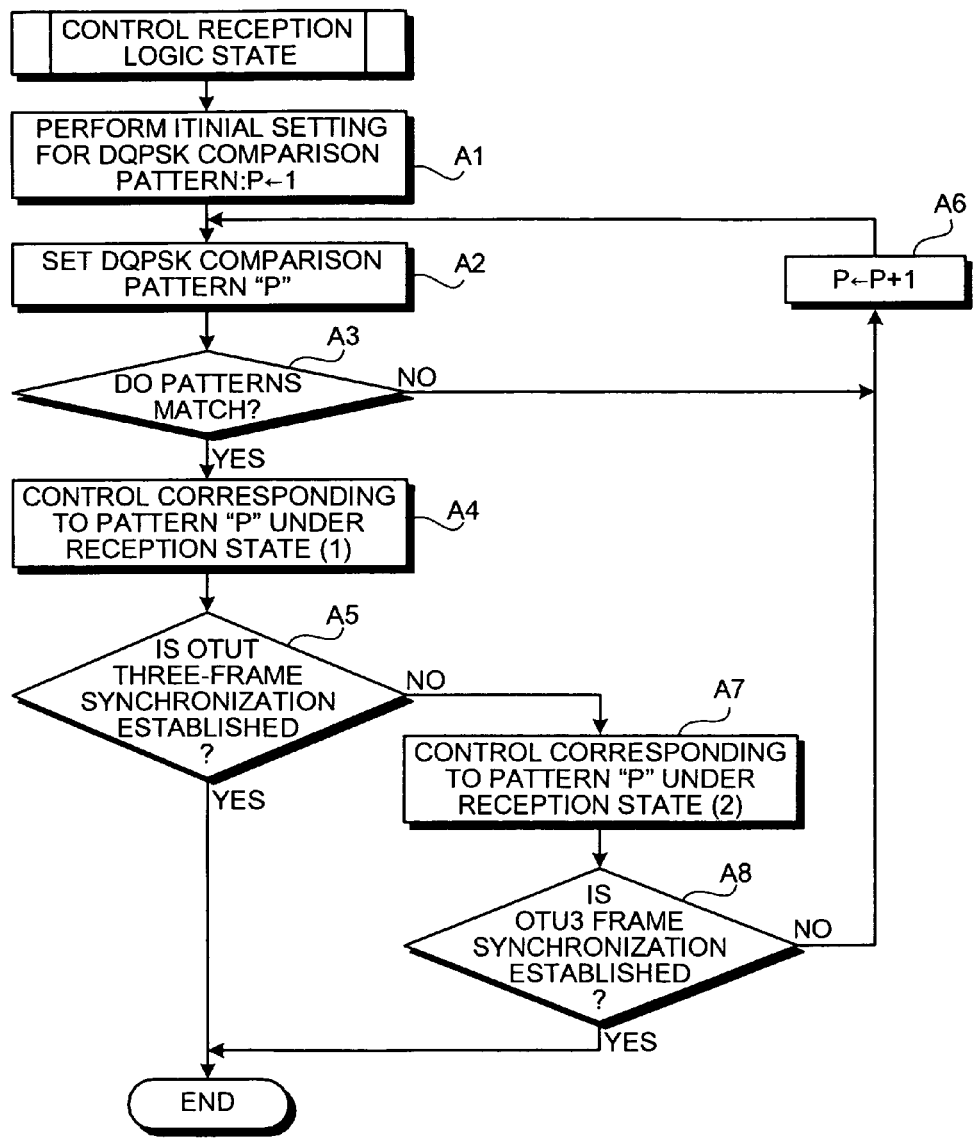
FIG. 4 is a flowchart of a second embodiment of the present invention.

Referring to FIG. 1, an optical signal receiving apparatus according to the present invention includes a receiving/demodulating unit 1 having a plurality of delay interferometers and photoelectric conversion elements that convert an in-phase signal and a quadrature signal of a DQPSK optical signal into each electrical signal, a multiplexing unit 6 that multiplexes each electrical signal, a parallelizing unit 8 that parallelizes the multiplexed signals transferred from the multiplexing unit 6, and a receiving/processing unit 9 that receives the input signals parallelized by the parallelizing unit 8 to execute a frame process including a frame synchronizing process on the input signals. The receiving/processing unit 9 has a frame synchronizing circuit 9c that establishes frame synchronization, a reception state recognizing circuit 9d that recognizes a reception state based on the parallelized signals, and a logic processing circuit 9a that executes a logic reversion process, a bit delay process, or a bit swap process in response to a reception state other than a desired reception state, other reception states being recognized by the logic processing circuit 9a, and to a reception state resulting from the parallelizing timing of the parallelizing unit 8.

The optical signal reception control method according to the present invention includes the following steps of; causing the receiving/demodulating unit 1 to convert an in-phase signal and a quadrature signal of a DQPSK optical signal into each electrical signal, causing the multiplexing unit 6 to multiplex each electrical signal and transfer the multiplexed signals to the parallelizing unit 8, causing the parallelizing unit 8 to parallelize the multiplexed signals and transfer the parallelized signals to the receiving/processing unit 9, and causing the receiving/processing unit 9 to compare the parallelized signals with comparison patterns and recognize a reception state, to execute the logic reversion process, the bit delay process, and the bit swap process in response to a reception state other than the desired reception state and to a reception state according to the parallelizing timing of the parallelizing unit 8, and to repeat these processes till the establishment of frame synchronization.

FIG. 1 is an explanatory diagram of a first embodiment according to the present invention. In FIG. 1, 1 denotes the receiving/demodulating unit (DQPSK OR) that receives a DQPSK optical signal and demodulates the signal, 2 denotes interferometer control unit, 3 and 4 denote clock/data recovering units (CDR A, CDR B), 5 denotes a clock/data recovery control unit (CDR cont.), 6 denotes the 2:1 multiplexing unit (MUX), 7 denotes a multiplexing control unit (MUX cont.), 8 denotes the parallelizing unit (DES: de-serializer), 9 denotes the receiving/processing unit, 9a denotes the logic processing unit, 9b denotes a frame processing unit, 9c denotes the frame synchronizing circuit, 9d denotes the reception state recognizing circuit 9d, and 10 denotes a control unit. While a DQPSK signal transferred at a transfer rate of 40 Gb/s is described in the first embodiment, the present invention is also applicable to signal transfer at another transfer rate (e.g., 10 Gb/s or 160 Gb/s). In the specification described herein, the clock/data recovering unit may be called clock recovering unit, and the clock/data recovery control unit may be called clock recovery control unit. According to the optical signal receiving apparatus shown in FIG. 1, the parallelizing unit puts out parallel signals in a signal number of 2.7 G×16 and the following processes are carried out. Another parallel signal number other than 2.7 G×16 (e.g., 10.8 G×4) may also be adopted.

The receiving/processing unit 9 includes the logic processing unit 9a, the frame processing unit 9b, the frame synchronizing circuit 9c, and the reception state recognizing circuit 9d, and has an LOF (loss of frame)/OOF (out of frame) detecting function. The receiving/processing unit 9 transfers LOF/OOF detection information to the control unit 10, as indicated by a dotted arrow in FIG. 1. The receiving/processing unit 9 shown in FIG. 1 performs input/output processes on 16 parallel data parallelized at the parallelizing unit 8 that are expressed as 2.7 G×16 and 2.5 G×16. The receiving/processing unit 9, however, may be given such a structure that is capable of processing data in a fewer parallel number through the improvement of the operation speed of circuit elements. The receiving/processing unit 9 capable of high-speed processing dispenses with the parallelizing unit 8. A larger line capacity allows an increase in a parallel process number.

The control unit 10 controls a bias voltage for or the temperature of the delay interferometers, as expressed as "interferometer bias control" indicated by a dotted arrow, via the interferometer control unit 2, also controls data logic reversion, as expressed as "logic reversion control" indicated by a dotted arrow, via the clock/data recovery control unit 5, and further controls a 2:1 multiplexing procedure, as expressed as "MUX timing control" indicated by a dotted arrow, via the multiplexing control unit 7. The control unit 10 keeps executing the above control until "LOF/OFF detection" information from the receiving/processing unit 9, which is expressed by a dotted arrow, disappears.

For example, a voltage applying electrode is formed at least on one of two optical waveguides, and a ground electrode is formed to be adjacent to the voltage applying electrode. A voltage (the above bias voltage) is applied to the voltage applying electrode to change the refraction factor of the optical waveguides, which results in a change in a reception state. In this case, the optical waveguides must be made on a board having an electrooptical effect. This technique is basically the same as a technique used for an optical modulator, and those skilled in the art can implement the technique easily. Such people can also readily implement a technique of changing the refraction factor by changing the temperature of the optical waveguides using a heater, etc.

In changing a reception state, the control unit 10 (a) controls the logic reversion of data at the clock/data recovering units 3, 4, using the clock/data recovery control unit 5, (b) controls multiplexing timing at the multiplexing unit 6, using the multiplexing control unit 7, and (c) adjusts a $\pi/4$ delay interferometer and a $-\pi/4$ delay interferometer in the receiving/demodulating unit 1 to operate the delay interferometers at an optimum operation point by controlling a bias voltage for or the temperature of the delay interferometers via the interferometer control unit 2. In this case, phase control in a range of $+\pi/2\pm n\pi$ or $-\pi/2\pm n\pi$ is carried out, where n denotes an integer, and an adjusting/control unit provided as an interferometer control unit 2 can be replaced with various known units. The control processes (a), (b), (c) are repeated until LOF/OFF detection information from the receiving/processing unit 9 disappears.

For example, in a DQPSk signal reception state shown in FIG. 27A, the reception state recognizing circuit 9d of the receiving/processing unit 9 recognizes each of the reception states of an in-phase signal lk and a quadrature signal Qk from an A channel (Ach) and a B channel (Bch) of the receiving/demodulating unit 1. The reception states includes a desired reception state marked with a double circle, a state marked with a circle that is turned into a state for reception by logic reversion, a state marked with a triangle that is turned into a state for reception by a combination of bit swap and logic reversion, a state marked with a diamond that is turned into a state for reception by bit swap, and a state marked with a cross that disables reception. In a case of the desired reception state marked with a double circle, the frame synchronizing circuit 9c of the receiving/processing unit 9 can perform synchronous frame capturing. The control unit 10, therefore, does not control each unit when the desired reception state is established.

The circle mark reception state indicates that data included in either or both of the signals from the A, B channels are logically reversed, which results in a reception state disabling synchronous frame capturing. In response to this, the control unit 10 controls the clock recovering units 3, 4 to execute data logic reversion via the clock/data recovery control unit 5, thus put the data back into a logic state leading to a desired reception state. The triangle mark reception state indicates that the data is in a state of logic reversion and bit swap, so that the control unit 10 executes logic reversion control and bit swap control to bring the desired reception state. The diamond mark reception state indicates that the data is in a state of bit swap, so that the control unit 10 executes bit swap control to bring the desired reception state.

The cross mark reception state indicates a state that makes synchronous frame capturing totally impossible, which leads to repeated execution of the control processes (a), (b), (c). In the processes, the control unit 10 controls the delay interferometers via the interferometer control unit 2 to operate the interferometers at the optimum operation point, and controls each unit to bring the desired reception state. Thus, the control unit 10 executes the above control to bring the desired reception state to enable a process of receiving and demodulating a DQPSK signal.

While the cross mark reception state requires at least control over the delay interferometers in the receiving/demodulating unit 1, this reception state does not result when the $\pi/4$ interferometer and $-\pi/4$ interferometer are set to operate with a phase difference of $\pi/2$. In this case, therefore, the control process during operation of the optical signal receiving apparatus becomes easy. While logic reversion control for a reception state other than the desired reception state marked with a double circle is executed by controlling the clock/data recovering units 3, 4, the logic reversion control can be executed by the logic processing unit 9a in the receiving/processing unit 9. Bit swap control and 1 bit delay control can be executed also by the logic processing unit 9a.

FIG. 2 depicts the internal structure of the receiving/processing unit 9. 21 denotes a logic reversing circuit, 22 denotes a 1 bit delay circuit, 23 denotes a bit swap circuit, 24 denotes a frame processing unit, 25 denotes a frame synchronizing circuit, 26 denotes a DQPSK signal reception state recognizing circuit, and 27 denotes a control unit. In the logic reversing circuit 21, EOR01 to EOR16 denote exclusive-OR circuits, Odd ch. denotes an odd channel setting unit, and Even ch. denotes an even channel setting unit. In the 1 bit delay circuit 22, SEL denotes selectors, SEL cont. denotes a selector control unit, and D denotes a 1 bit delay circuit (delay). In the bit swap circuit 23, SW denotes switching circuits, and SW cont. denotes a switching control unit.

The logic reversing circuit 21, the 1 bit delay circuit 22, and the bit swap circuit 23 jointly represent the logic processing unit 9a shown in FIG. 1. Demodulated signals consisting of in-phase signals and quadrature signals, which are converted into 16 parallel data of 2.7 G×16 by the parallelizing unit 8 (see FIG. 1), are put into the receiving/processing unit 9. In the receiving/processing unit 9, the input signals are transferred thorough the logic reversing circuit 21, the 1 bit delay circuit 22, and the bit swap circuit 23 to be put into the frame processing unit 24, the frame synchronizing circuit 25, and the DQPSK signal reception state recognizing circuit 26.

For an OTN (optical transport network) system specified in the ITU-TG.709 recommendation, FAS (frame alignment signal) bytes are defined as frame synchronization bits in the overhead of an OTU (optical transport unit). The frame synchronizing circuit 25, which conforms to the recommendation, has a function of judging the establishment of frame synchronization when receiving data of OA1 ("111110110") and OA2 ("00101000") in the order of OA1, OA1, OA1, OA2, OA2, OA2, OA2. FAS bytes are equivalent to synchronous bytes A1, A2 in the overhead of a frame in an SDH (synchronous digital hierarchy) system and a SONET (synchronous optical network) system. When a transmission method according to the SDH or SONET standard is employed, therefore, the frame synchronizing circuit 25 detects the synchronous bytes A1, A2 in carrying out an OTUk-FAS detection process.

The DQPSK signal reception state recognizing circuit 26 receives signals (16 parallel data) to be put into the frame synchronizing circuit 25, and recognize a reception state by OTUk-FAS comparison according to OTUk-FAS comparison byte setting from the control unit 27. If 16 frame synchronizing circuits 25 are arranged in parallel to provide a structure that allows frame synchronization detection by 16 parallel processing, a reception state can be recognized based on a detection result from each frame synchronizing circuit. Information of a recognized reception state is imparted to the control unit 27. The function of the control unit 27 may be given to the control unit 10 shown in FIG. 10 to provide a structure that enables the control unit 10 to control each unit based on reception state information.

The control unit 27 executes logic reversion setting, 1 bit delay setting, and bit swap setting according to the contents of a reception state imparted by the DQPSK signal reception state recognizing circuit 26, and also controls the delay interferometers of the receiving/processing unit 1. For example, when the control unit 27 sets logic "1" on the odd channel setting unit Odd ch., odd exclusive-OR circuits execute logic reversion. 1 bit delay setting by the control unit 27 causes the selector control unit SEL cont. in the 1 bit delay circuit 22 to control the selectors SEL, which delay serial signals before undergoing 16 parallel conversion by one bit before the conversion of the serial signals into 16 parallel signals. As a result, signal output from the exclusive-OR circuits EOR01 to EOR16 is turned into signal output from the EOR02 to EOR16 and EOR01, and the signals put out of the EOR02 to EOR16 and EOR01 are put into the bit swap circuit 23. In this process, the 1 bit delay circuit D delays an output signal from the exclusive-OR circuit EOR16 by one bit, causing the output signal to be put out of exclusive-OR circuit EOR01.

The bit swap circuit 23 executes an exchange of adjacent bits in 16 parallel data. This bit exchange control is equivalent to bit arrangement order control through multiplexing timing control by the multiplexing unit 6 shown in FIG. 1. An optical signal receiving apparatus having the bit swap circuit 23, therefore, can dispense with the multiplexing timing control unit shown in FIG. 1.

Figure 26:
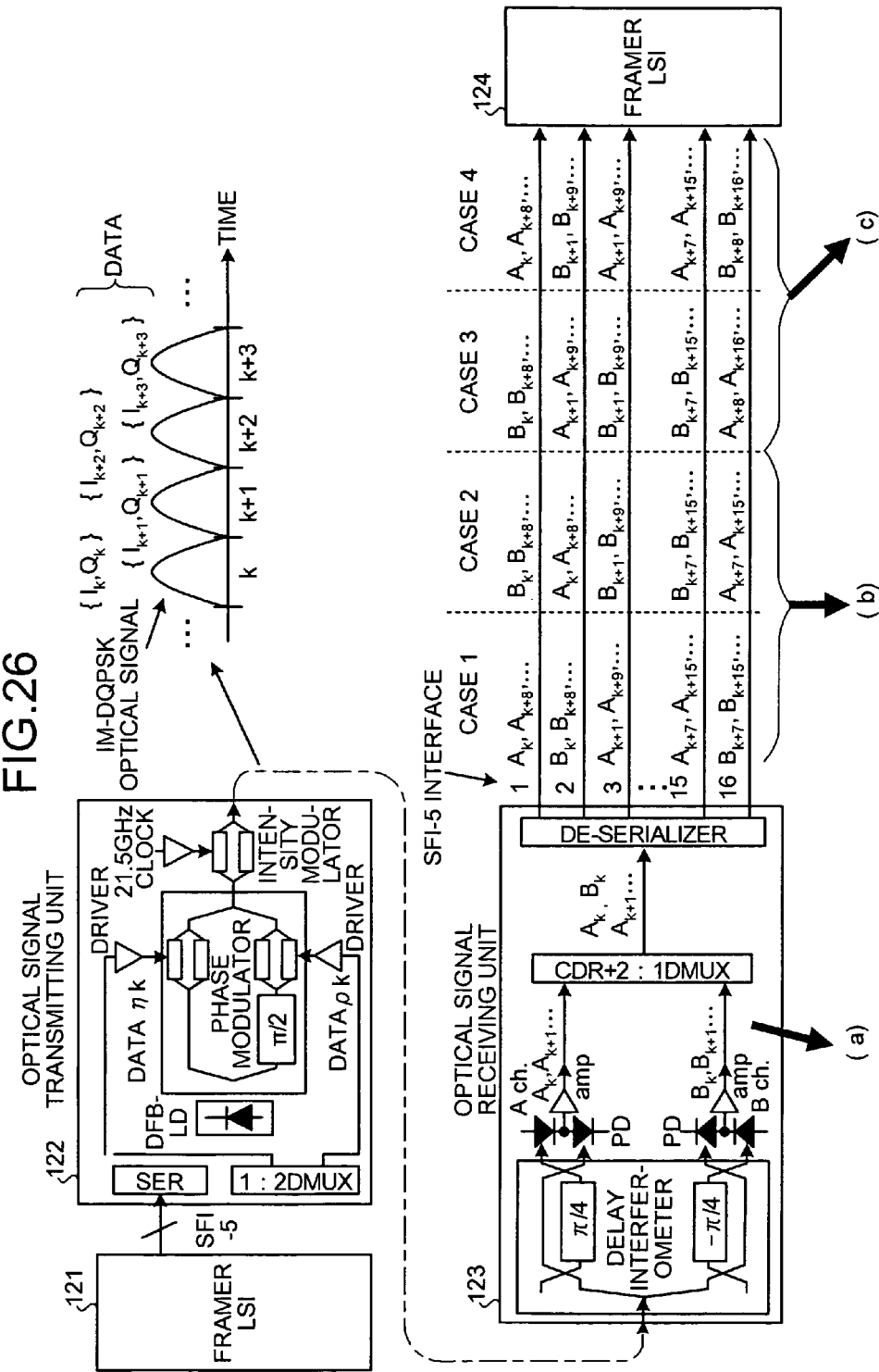
FIG. 26 is an explanatory diagram of main units of a conventional optical signal transmitting unit and of a conventional optical signal receiving unit.

FIG. 3 depicts reception states and control according to the configuration shown FIGS. 1, 2. In FIG. 3, logic state control BS represents bit swap control, logic state control 1D represents 1 bit delay control, and logic state control MZI represents interferometer control. Check marks mean execution of logic state control. 16 bit patterns of signals, which are converted by the parallelizing unit 8 shown in FIG. 8 into 16 parallel signals and are put into the receiving/processing unit 9, are defined as DQPSK comparison patterns, which are represented by item numbers 1 to 16 as 16 types of patterns. For example, the DQPSk comparison pattern of the item number 13 "1111 0110 0010 1000" is shown to be in a desired reception state marked with a double circle under reception states (1), (2) (see FIGS. 26, 27). In this case, the order of odd bit signals and even bit signals in series becomes lk, Qk under the reception state (1), and becomes qk, lk+1 under the reception state (2) (see display of RZ-DQPSK signals on the time axis shown in FIG. 26). This desired reception state allows synchronous frame capturing, and a frame synchronization signal from the frame synchronizing circuit 25 is put into the frame processing unit 24.

The item numbers 1, 2, 5, 6, 11, 12, 15, 16 indicate that comparison patterns are in a reception state marked with a cross, which necessitates execution of interferometer control MZI regardless of being under either reception state (1) or (2), thus bias control or temperature control for the interferometers is executed by the control unit 10 via the interferometer control unit 2, as shown in FIG. 1. The interferometer control MZI turns the cross mark reception state into a reception state marked with a triangle, diamond, circle, or a double circle. For the item number 3 in the triangle mark reception state, logic reversion at even bits and bit swap are carried out under the reception state (1). In this case, logic "1" is set on the even channel setting unit Even ch. in the logic reversing circuit 21 to execute logic reversion via the exclusive-OR circuits, and the switching circuits SW are controlled by the switching control unit SW cont. to execute data exchange between odd channels and even channels. Under the reception state (2), control for logic reversion at odd bits, for bit swap, and for 1 bit delay is executed.

For the item number 4 in the diamond mark reception state, the bit swap control BS is executed under the reception state (1), and the bit swap control BS and the 1 bit delay control 1D are executed under the reception state (2). For the item number 9 in the circle mark reception state, logic reversion control at odd channels is executed under the reception state (1), and logic reversion control at even channels is executed under the reception state (2).

As described above, controlling each unit in response to the reception states (1), (2) brings a desired reception state. This allows the optical signal receiving apparatus to judge on a signal reception state at the start of the operation and in response to various conditional changes during the operation as well, and execute control according to a judgment on a reception state to obtain the desired reception state.

FIG. 4 is a flowchart of a second embodiment of the present invention. An optical signal receiving apparatus according to the second embodiment has a structure that keeps a phase difference between the $\pi/4$ delay interferometer and the $-\pi/4$ delay interferometer (see FIG. 1) at $\pi/2$. FIG. 5 illustrates reception states and control resulting from such a structure. Specifically, in this case, control over the interferometers is not necessary, so that the cross mark reception states are eliminated from FIG. 3 to give reception states marked with a double circle, circle, triangular, or diamond, as shown in FIG. 5. The control in response to the reception states (1), (2), therefore, become eight types for item numbers 1 to 8. In this case, as in the case shown in FIG. 3, a reception state showing a signal pattern identical with the DQPSK comparison pattern of "1111 0110 0010 1000" represented by the item number 7 is defined as a desired reception state marked with a double circle.

First, the initial setting for DQPSDK comparison patterns is carried out (step A1). When a DQPSK comparison pattern P indicates the item number 1 in FIG. 5, which is expressed as P←1, a pattern of "1010 1100 0100 0001" is set at the initial setting. In the same manner, a DQPSK comparison pattern P corresponding to each item number is set (step A2). Specifically, the DQPSK comparison pattern P is shown to the reception state recognizing circuit 26 as OTUk-FAS byte setting under control by the control unit 27, and the reception state recognizing circuit 26 judges on matching of a signal pattern to the comparison pattern P (step A3). If the signal pattern matches to the comparison pattern P ("YES" at step A3), control corresponding to the comparison pattern P under the reception state (1) is carried out (step A4). For example, when a signal pattern matches to the DQPSK comparison pattern P of the item number 1, the reception state of the signal pattern is marked with a triangle, which requires control under the assumed reception state (1) of even channel logic reversion control and bit swap control. Hence the logic reversing circuit 21 shown in FIG. 2 is controlled to execute logic reversion at even channels, and the bit swap circuit 23 is controlled to execute bit swap between adjacent channels.

Subsequently, establishment of PTU (optical transport unit) three-frame synchronization is judged (step A5). In other words, judgment is made on whether frame synchronization has been established by the frame synchronizing circuit 25 shown in FIG. 2. Establishment of frame synchronization ("YES" at step A5) means realization of a desired reception state, which case brings the overall control process to an end. When no match of patterns is detected at A3 "NO" at step A3), P+1 is substituted for P (step A6), which means the item number 1 is replaced with the item number 2 in FIG. 5 to set the comparison pattern corresponding to the item number 2 (step A2), and match of patterns is judged (step A3). This process is repeated until a signal pattern matches to the comparison pattern.

Match of patterns leads to control executed under the reception state (1) (step A4), which is followed by judgment on establishment of frame synchronization by the frame synchronizing circuit 25 (step A5). When frame synchronization cannot be established "NO" at step A5), control corresponding to a pattern P under the reception state (2) is carried out (step A7), which is followed by judgment on establishment of frame synchronization (step A8). Establishment of frame synchronization ("YES" at step A8) means realization of the desired reception state, which case brings the overall control process to an end. If frame synchronization cannot be established "NO" at step A8), the operational flow proceeds from A6 to A2, from which the above control process is repeated. The order of the PQDSK comparison patterns corresponding to the item numbers shown in FIGS. 3 and 5 is one example. The same process as described above is executed for PQDSK comparison patterns arranged in another order.

In the above control process, each DQPSK comparison pattern is selected sequentially to recognize a reception state. For the recognition of a reception state, another method is available such that eight types of comparison patterns corresponding to the item numbers 1 to 8 are set in the DQPSK signal reception state recognizing circuit 26, where match of a signal pattern to any one of the comparison patterns is checked to recognize a reception state.

Figure 6A:
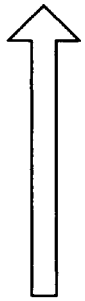
FIG. 6A is an explanatory diagram of reception states according to a third embodiment of the present invention.

FIG. 6A is an explanatory diagram (1) of reception states according to a third embodiment of the present invention. (A) in FIG. 6A shows reception states that results when the $\pi/4$ delay interferometer and $-\pi/4$ delay interferometer of the receiving/processing unit 1 (see FIG. 1) are controlled via the control unit 10. The reception states shown in (A) consist of 16 reception states, which are marked with a double circle, which indicates a desired reception state, circles, triangles, diamonds, and crosses. In contrast, when the device is given such a structure that a phase difference between the $\pi/4$ delay interferometer and the $-\pi/4$ delay interferometer can be maintained at about $\pi/2$, the cross reception state does not result, which brings eight reception states each highlighted with a square frame, as shown in (B) in FIG. 6A. The eight reception states are marked with one double circle, three circles, and three triangles.

Even if a multiplexing phase is fixed completely at the multiplexing unit 6 (see FIG. 1), the reception state (1) or (2) results at the receiving/processing unit 9, as described before, because the head position of signals cannot be specified based on frame synchronization when the signals are divided into 16 parallel signals by the parallelizing unit 8. In this case, therefore, 16 parallel signals put into the receiving/processing unit 9 corresponds to the reception state (1) or (2), which brings eight reception states each highlighted with a square frame, as shown in (C) or (D) in FIG. 6A. The eight reception states are marked with one double circle, three circles, and three triangles. The contents of control executed in response to the eight reception states is the same as shown in FIG. 5.

Figure 6B:
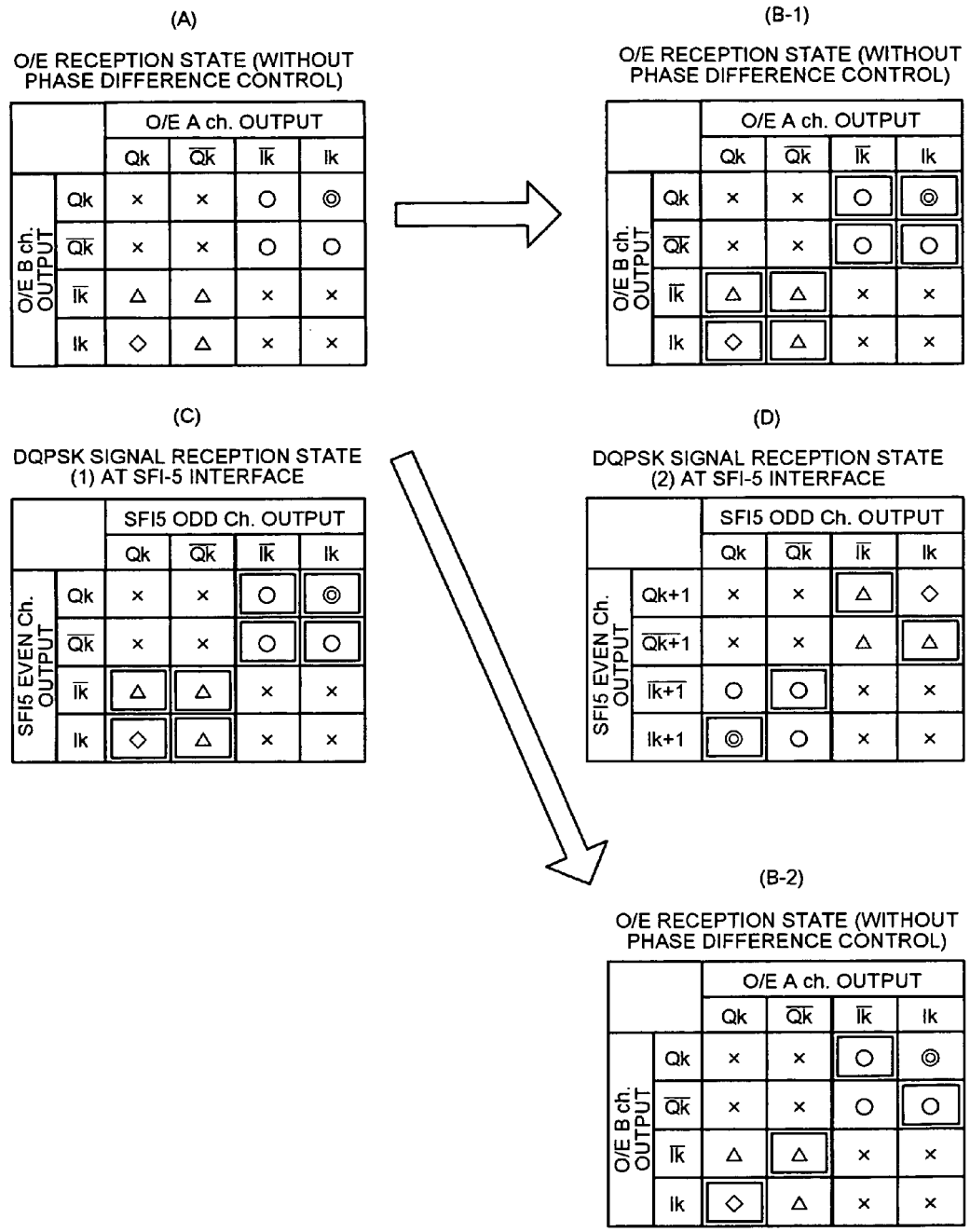
FIG. 6B is an explanatory diagram of reception states according to the third embodiment.

FIG. 6B is an explanatory diagram (2) of reception states according to the third embodiment of the present invention. (A) in FIG. 6B shows reception states that results when the π/4 delay interferometer and −π/4 delay interferometer of the receiving/processing unit 1 (see FIG. 1) are controlled via the control unit 10. The reception states shown in (B) consist of 16 reception states, which are marked with a double circle, which indicates a desired reception state, circles, triangles, diamonds, and crosses. In contrast, when the device is given such a structure that the π/2 phase shifter included in the phase modulator in the DQPSK optical signal transmitting unit 122 (see FIG. 26) can keep a phase difference between an in-phase signal and a quadrature signal at π/2±2πn, and that a phase difference between the π/4 delay interferometer and the −π/4 delay interferometer in the receiving/processing unit 1 (see FIG. 1) can be maintained at about π/2, the cross reception state does not result, which brings eight reception states each highlighted with a square frame, as shown in (B-1) in FIG. 6B. The eight reception states are marked with one double circle, three circles, and three triangles.

When the device is given such a structure that the π/2 phase shifter included in the phase modulator in the DQPSK optical signal transmitting unit 122 (see FIG. 26) can keep a phase difference between an in-phase signal and a quadrature signal at −π/2±2πn, and that a phase difference between the π/4 delay interferometer and the −π/4 delay interferometer in the receiving/processing unit 1 (see FIG. 1) can be maintained at about π/2, four reception states each highlighted with a square frame, as shown in (B-2) in FIG. 6B, results. The four reception states are marked with two circles, one triangle, and one diamond.

Even if a multiplexing phase is fixed completely at the multiplexing unit 6 (see FIG. 1), the reception state (1) or (2) results at the receiving/processing unit 9, as described before, because the head position of signals cannot be specified based on frame synchronization when the signals are divided into 16 parallel signals by the parallelizing unit 8. In this case, therefore, 16 parallel signals put into the receiving/processing unit 9 correspond to the reception state (1) or (2). Thus, the reception states as shown in (B-1) in FIG. 6B results as eight reception states each highlighted with a square frame, as shown in (C) or (D) in FIG. 6A, which are with marked with one double circle, three circles, and three triangles. Likewise, the reception states as shown in (B-2) in FIG. 6B results as four reception states, which means the receiving/processing unit 9 receives input signals in four states.

FIG. 7 depicts the contents of control executed in response to the above four reception states. According to the control, four types of DQPSK comparison patterns represented by item numbers 1 to 4 are set selectively to recognize a reception state. In response to each reception state, the logic reversing circuit 21, the bit delay circuit 22, and the bit swap circuit 23 shown in FIG. 2 are controlled. For example, the item number 1 corresponds to the item number 3 shown in FIG. 3, which is in a reception state marked with a triangle. In this case, when signal reception occurs under the reception state (1), logic reversion control at even channels by the logic reversing circuit 21 and bit swap control by the bit swap circuit 23 are executed. When signal reception occurs under the reception state (2), control to execute includes logic reversion control at odd channels by the logic reversing circuit 21, bit swap control by the bit swap circuit 23, and 1 bit delay control by the 1 bit delay circuit 22. The executed control turns the triangle mark reception state into a desired reception state marked with a double circle. The item number 3 corresponds to the item 10 in FIG. 3, which leads to execution of logic reversion control at odd/even channels by the logic reversing circuit 21 under the reception states (1), (2).

Since a reception state recognition process in the above case is carried out using four types of DQPSK comparison patterns marked with one double circle, one circle, and two triangles, the reception state recognition process can be speeded up by setting the four types of DQPSK comparison patterns in the reception state recognizing circuit 26 (see FIG. 2) and carrying out parallel comparison.

Figure 8:
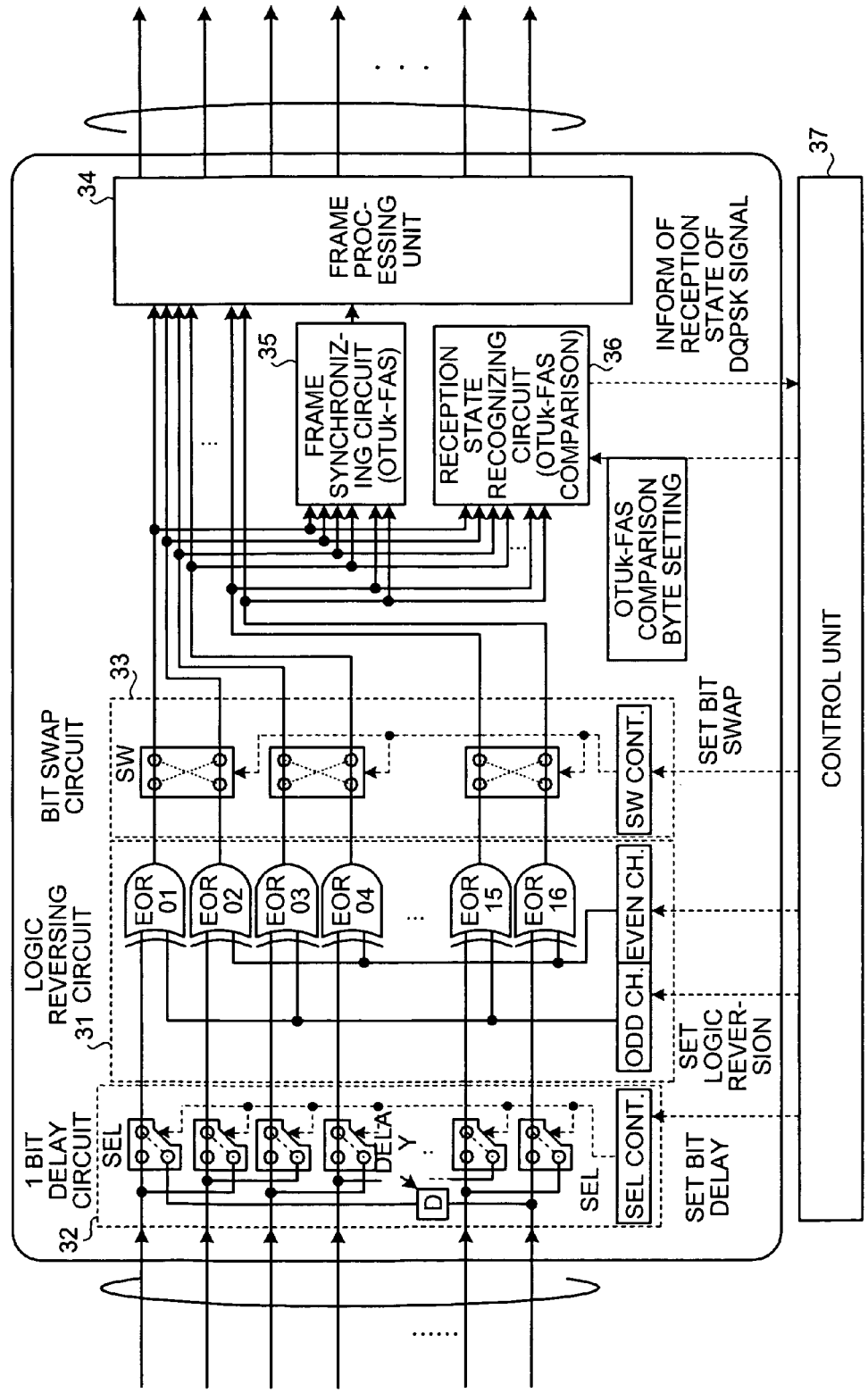
FIG. 8 is an explanatory diagram of a main unit of a fourth embodiment of the present invention.

FIG. 8 is an explanatory diagram of the main unit of an optical signal receiving apparatus according to a forth embodiment of the present invention. FIG. 8 illustrates the internal structure of the receiving/processing unit 9 shown in FIG. 1. 31 denotes a logic reversing circuit, 34 denotes a 1 bit delay circuit, 33 denotes a bit swap circuit, 34 denotes a frame processing unit, 35 denotes a frame synchronizing circuit, 36 denotes a DQPSK signal reception state recognizing circuit, and 37 denotes a control unit. In the logic reversing circuit 31, EOR01 to EOR16 denote exclusive-OR circuits, Odd ch. denotes an odd channel setting unit, and Even ch. denotes an even channel setting unit. In the 1 bit delay circuit 32, SEL denotes selectors, SEL cont. denotes a selector control unit, and D denotes a 1 bit delay circuit. In the bit swap circuit 33, SW denotes switching circuits, and SW cont. denotes a switching control unit.

The logic reversing circuit 31, the 1 bit delay circuit 32, and the bit swap circuit 33 jointly represent the logic processing unit 9a shown in FIG. 1. Demodulated signals consisting of in-phase signals and quadrature signals, which are converted into 16 parallel data of 2.7 G×16 by the parallelizing unit 8 (see FIG. 1), are put into the receiving/processing unit 9. In the receiving/processing unit 9, the input signals are transferred thorough the 1 bit delay circuit 32, the logic reversing circuit 31, and the bit swap circuit 33 to be put into the frame processing unit 34, the frame synchronizing circuit 35, and the DQPSK signal reception state recognizing circuit 36.

Reception states shown in FIG. 9 results when the device is given the structure that a phase difference between the π/4 delay interferometer and the −π/4 delay interferometer (see FIG. 1) can be maintained at about π/2. As described before, this structure does not require control over delay interferometers, allowing the elimination of the cross mark reception states from the reception states shown in FIG. 3. This brings the reception states shown in FIG. 9, which are marked with a double circle, circles, triangles, and diamonds, where eight types of control corresponding to reception states (1), (3) are defined for item numbers 1 to 8. In this case, a reception state showing the DQPSK comparison pattern "1111 0110 0010 1000" is defined as a desired reception state, which is indicated by the item number 7 marked with a double circle. The reception state (1) is identical with the reception state (1) shown in FIG. 5, and illustrates the same control as shown in FIG. 5. The reception state (3) is identical with the reception state (2) shown in FIG. 5, but exhibits control different from that of FIG. 5. This is because the logic reversing circuit 31 is connected to the 1 bit delay circuit 32 at the back stage to the bit delay circuit 32, as shown FIG. 8.

Figure 10:
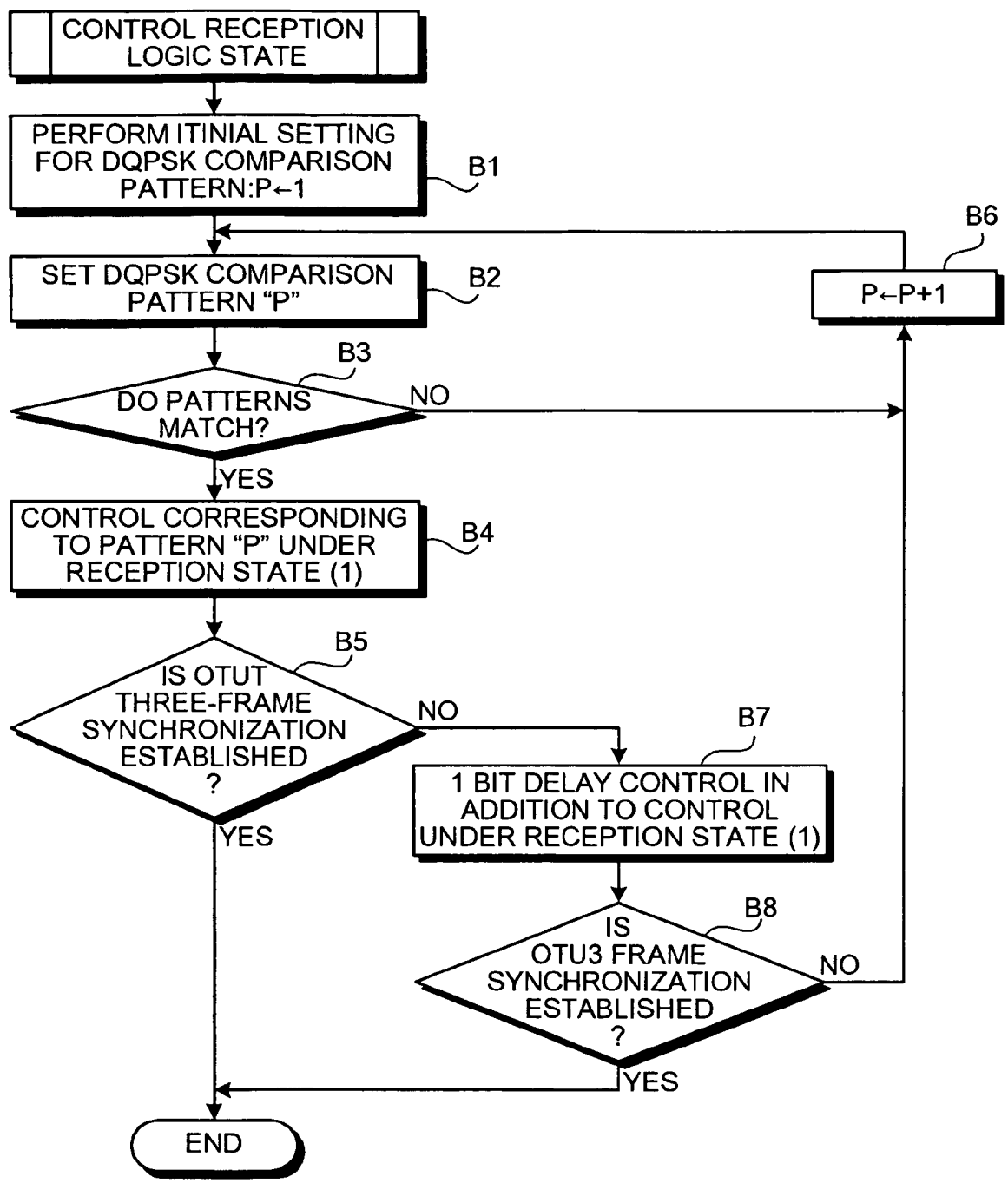
FIG. 10 is a flowchart of the fourth embodiment.

FIG. 10 is a flowchart of a fourth embodiment of the present invention. First, the initial setting for DQPSDK comparison patterns is carried out (step B1). When a DQPSK comparison pattern P indicates the item number 1 in FIG. 9, which is expressed as P←1, a pattern of "1010 1100 0100 0001" is set at the initial setting. In a similar manner, a DQPSK comparison pattern P corresponding to each item number is set (step B2). Specifically, the DQPSK comparison pattern P is shown to the reception state recognizing circuit 36 as OTUk-FAS byte setting under control by the control unit 37 shown in FIG. 8, and the reception state recognizing circuit 36 judges on matching of a signal pattern to the comparison pattern P (step B3). If the signal pattern matches to the comparison pattern P ("YES" at step B3), the control corresponding to the comparison pattern P under the reception state (1) shown in FIG. 9 is carried out (step B4). For example, when a signal pattern matches to the DQPSK comparison pattern P of the item number 1, the reception state of the signal pattern is marked with a triangle, which requires control under the assumed reception state of even channel logic reversion control and bit swap control. Hence the logic reversion circuit 31 shown in FIG. 8 is controlled to execute logic reversion at even channels, and the bit swap circuit 33 is controlled to execute bit swap between adjacent channels.

Then, establishment of PTU (optical transport unit) three-frame synchronization is judged (step B5). In other words, judgment is made on whether frame synchronization has been established by the frame synchronizing circuit 35 shown in FIG. 8. Establishment of frame synchronization ("YES" at step B5) means realization of a desired reception state, which case brings the overall control process to an end. When no match of patterns is detected at step B3 "NO" at step B3), P+1 is substituted for P (step B6), which means the item number 1 is replaced with the item number 2 in FIG. 9 to set the comparison pattern corresponding to the item number 2 (step B2), and match of patterns is judged (step B3). This process is repeated until a signal pattern matches to the comparison pattern at step B3.

Match of patterns leads to the control executed under the reception state (1) (step B4), which is followed by judgment on establishment of frame synchronization by the frame synchronizing circuit 35 (step B5). When frame synchronization cannot be established "NO" at step B5), control over the 1 bit delay circuit 32 shown in FIG. 8 is executed in addition to the control executed under the reception state (1) (step B7). The control over the 1 bit delay circuit 32 is equivalent to control executed under the reception state (3). Then, establishment of frame synchronization is judged (step B8). Establishment of frame synchronization ("YES" at step A8) means realization of a desired reception state, which case brings the overall control process to an end. If frame synchronization cannot be established "NO" at step A8), a process of proceeding to the next item number is executed at B6, from which the above control process is repeated. The order of the PQDSK comparison patterns corresponding to the item numbers shown in FIG. 9 is one example. The same process as described above is executed for PQDSK comparison patterns arranged in another order.

In the above control process, each DQPSK comparison pattern is selected sequentially to recognize a reception state. For the recognition of a reception state, another method is available such that eight DQPSK signal reception state recognizing circuits 36 are arranged in parallel, and each of eight types of comparison patterns corresponding to the item numbers 1 to 8 is set on each recognition circuit 36, where match of a signal pattern to a comparison patterns is checked to recognize a reception state.

Figure 11:
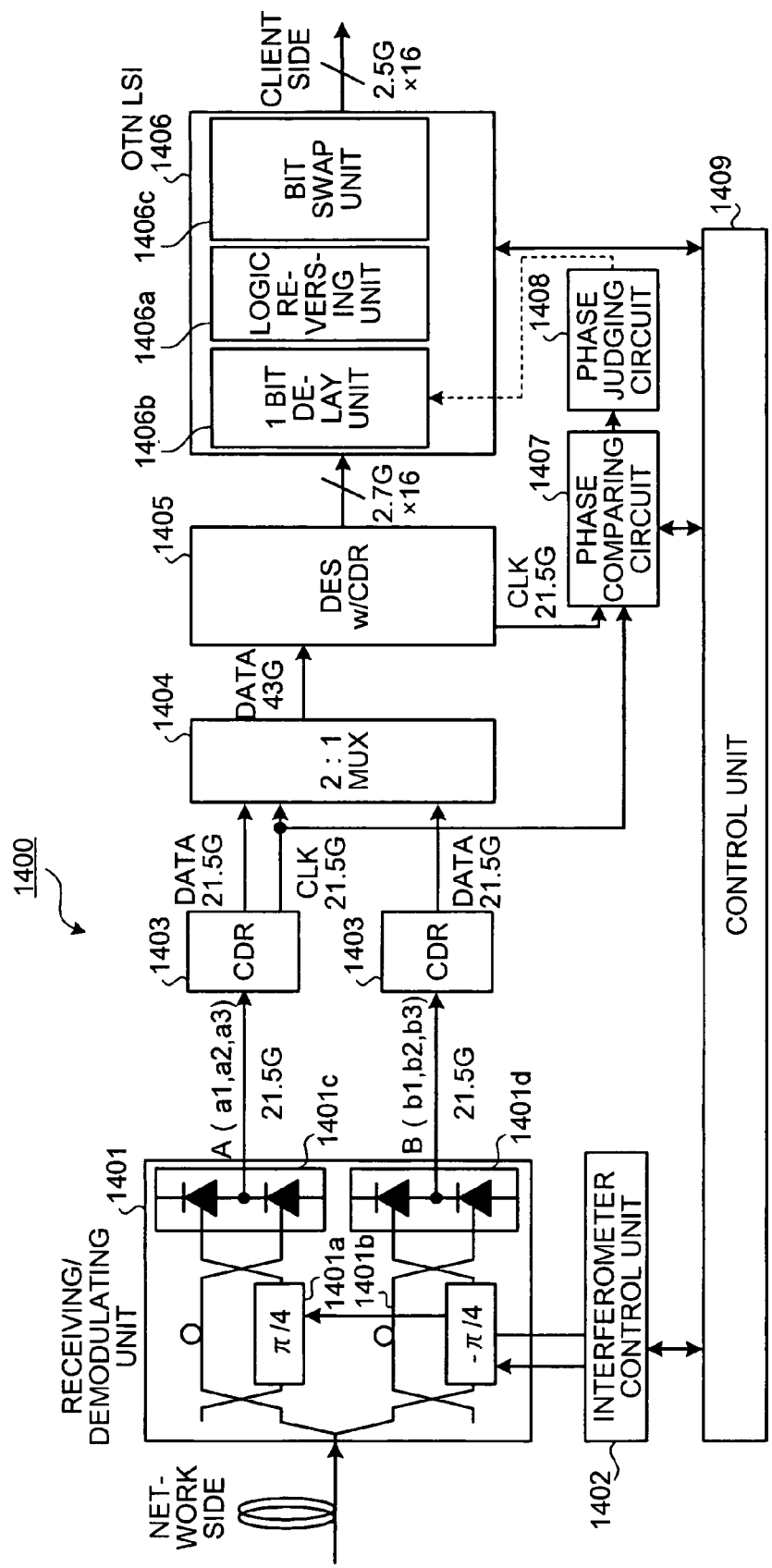
FIG. 11 is a block diagram of the structure of an optical signal receiving apparatus according to a fifth embodiment.

FIG. 11 is a block diagram of the structure of an optical signal receiving apparatus according to a fifth embodiment. The optical signal receiving apparatus 1400 includes a receiving/modulating unit 1401, an interferometer control unit 1402, a clock/data recovering unit (CDR: clock and data recovery) 1403, a multiplexing unit (2:1 MUX: multiplexer) 1404, a parallelizing unit (DES) 1405, a receiving/processing unit (OTN LSI) 1406, a phase comparing circuit 1407, a phase judging circuit 1408, and a control unit 1409.

The receiving/modulating unit 1401 has a $\pi/4$ delay interferometer 1401a, a $-\pi/4$ delay interferometer 1401b, and photoelectric conversion elements 1401c, 1401d. The receiving/modulating unit 1401 converts two input signals carrying phases perpendicular to each other into two strong electrical signals. The clock/data recovering unit 1403 extracts and recovers data and a clock signal from the input electrical signals. The multiplexing unit 1404 multiplexes two data of 21.5 Gb/s. The parallelizing unit 1405 has a built-in clock recovering unit (CDR), and parallelizes data of 43 Gb/s multiplexed by the multiplexing unit 1404 into 16 parallel data of 2.7 Gb/s.

The receiving/processing unit 1406 has a logic reversing unit 1406a, a 1 bit delay unit 1406b, and a bit swapping unit 1406c. The receiving/processing unit 1406 has a frame processing function, and detects frame loss information (LOF: loss of frame) and out-of-frame-synchronization information (OOF: out of frame) by frame processing. The receiving/processing unit 1406 transfers LOF/OOF detection information to the control unit 1409. The logic reversing unit 1406a, the 1 bit delay unit 1406b, and the swapping unit 1406c are each equivalent to the logic reversing circuit 31, the 1 bit delay circuit 32, and the bit swap circuit 33, which are shown in FIG. 8.

FIG. 11 exhibits the receiving/processing unit 1406 that has a structure to perform input/output processes on 16 parallel data parallelized at the parallelizing unit 1405, which are expressed as 2.7 G×16 and 2.5 G×16. The receiving/processing unit 1405, however, may be given such a structure that is capable of processing data in a fewer parallel number through the improvement of the operation speed of circuit elements. The parallel number can be increased in response to an increase in a line capacity.

The control unit 1409 controls a bias voltage for or the temperature of the $\pi/4$ delay interferometer 1401a and $-\pi/4$ delay interferometer 1401b in the receiving/modulating unit via the interferometer control unit 1402 until the LOF/OOF detection information transferred from the receiving/processing unit 1406 disappears. The control unit 1409 executes phase control in a range of $+\pi/2\pm n\pi$ or $-\pi/\pm n\pi$, and various types of known units can be used as an adjusting/control unit, which is the interferometer control unit 1402 in this case, for the phase control.

The phase of a clock signal at the parallelizing unit 1405 shifts by a half cycle between the reception state (1) and the reception state (2). Using this phenomenon, the phase comparing circuit 1407 and the phase judging circuit 1408 judge on whether incoming signals are in the reception state (1) or in the reception state (2). However, an optical signal traveling at high speed makes it difficult to judge whether a signal phase shift has occurred. Because of this, the phase comparing circuit 1407 and the phase judging circuit 1408 judge on the occurrence or nonoccurrence of a phase shift of a clock signal at the parallelizing unit 1405 by making use of a phase difference between a clock signal at the clock/data recovering unit 1403, which clock signal is constant regardless of the phase of the clock signal at the parallelizing unit 1405, and the clock signal at the parallelizing unit 1405. Phase shift judgment by the phase comparing circuit 1407 and the phase judging circuit 1408 will be described in detail below.

Figure 12:
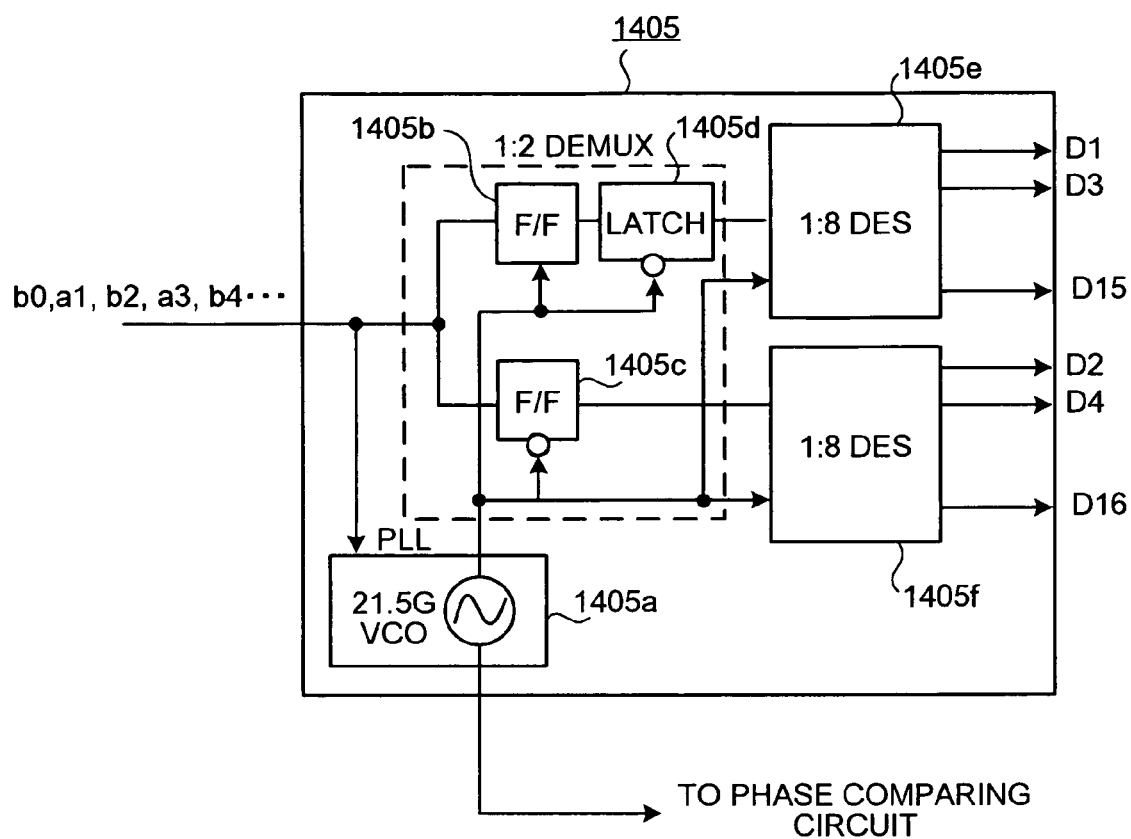
FIG. 12 is a block diagram of the internal structure of a parallelizing unit of the optical signal receiving apparatus according to the fifth embodiment.

FIG. 12 is a block diagram of the internal structure of the parallelizing unit of the optical signal receiving apparatus according to the fifth embodiment. The parallelizing unit 1405 includes an oscillator (VCO: voltage controlled oscillator) 1405a, a flip-flop circuit (F/F) 1405b, a flip-flop circuit 1405c, a latch circuit 1405d, a parallelizing circuit (1:8 DES) 1405e, and a parallelizing circuit (1:8 DES) 1405f.

Signals b0, a1, a2, a3, b4 . . . from the multiplexing unit 1404 into the parallelizing unit 1405 are divided into odd signals and even signals. The odd signals are put out from the parallelizing circuit 1405e, while the even signals are put out from the parallelizing circuit 1405f.

Figure 13:
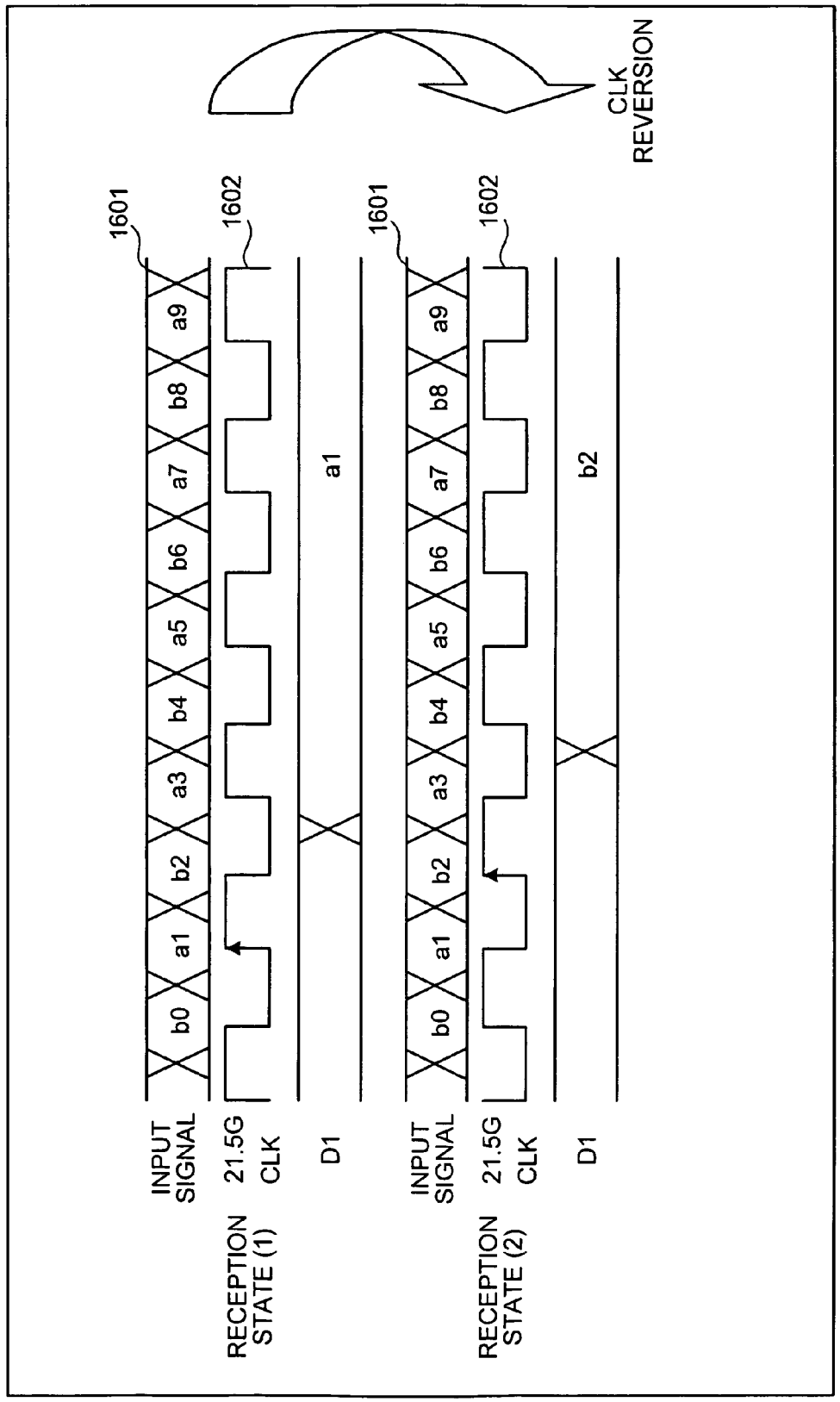
FIG. 13 depicts a clock signal from the parallelizing unit in the case of a reception state (1) and of a reception state (2)

FIG. 13 depicts a clock signal at the parallelizing unit in the case of the reception state (1) and of the reception state (2). In the case of the reception state (1), A-series input signals (a1, a3 . . . ) 1601 put out of the π/4 delay interferometer 1401a shown in FIG. 11 correspond to the raising edges of the clock signal (21.5 G CLK) 1602 at the parallelizing unit 1405. In the case of the reception state (2), A-series input signals 1601 correspond to the reverse edges of the clock signal (21.5 G CLK) 1602 at the parallelizing unit 1405.

As shown in FIG. 13, the phase of the clock signal 1602 at the parallelizing unit 1405 shifts by a half cycle between the reception state (1) and the reception state (2). In the case of the reception state (1), a signal a1 is put out from an output 1 (D1) of the parallelizing circuit 1405e shown in FIG. 12. In the case of the reception state (2), a signal b2 is put out from the output 1 (D1) of the parallelizing circuit 1405e shown in FIG. 12.

Figure 14:
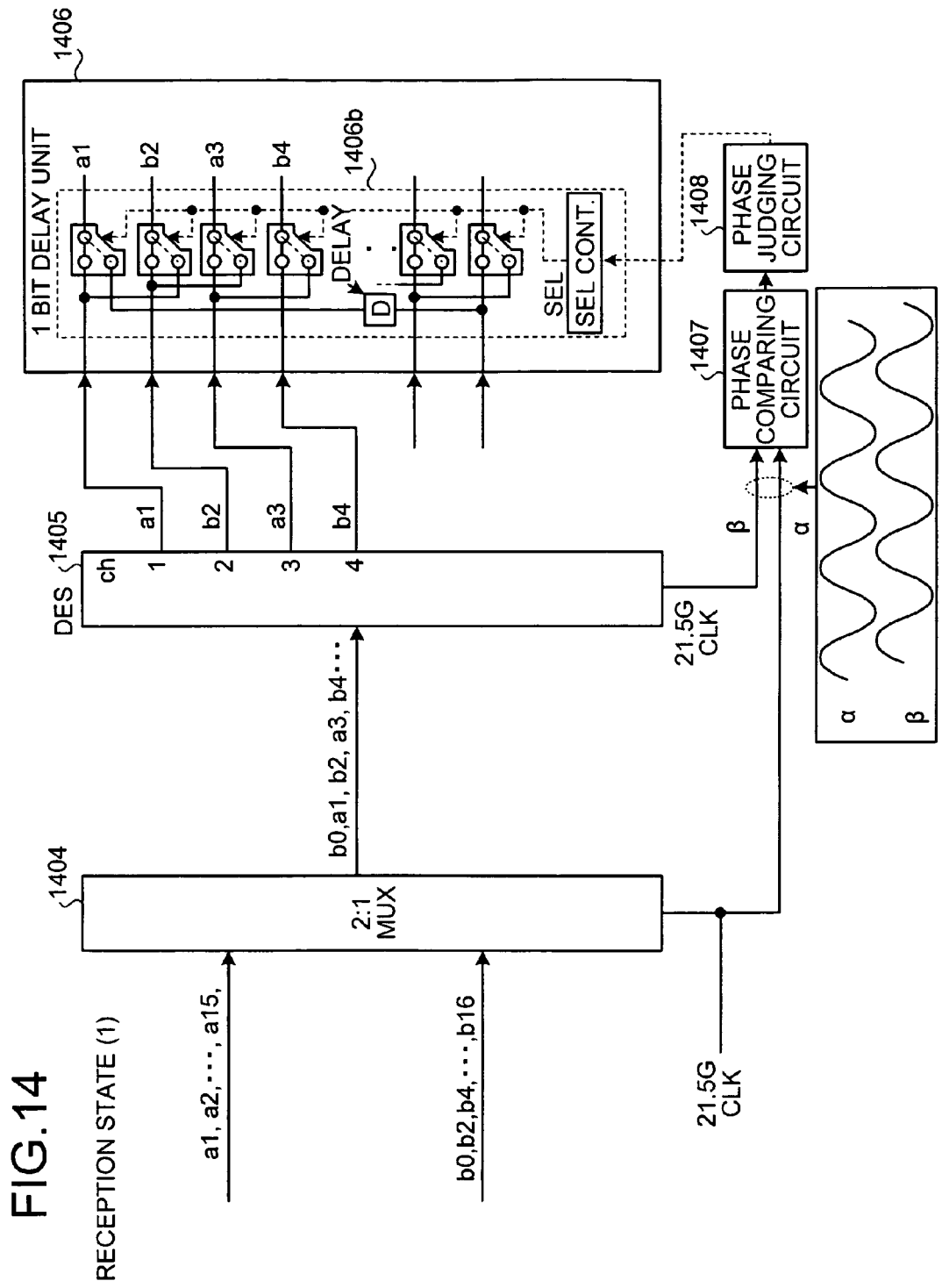
FIG. 14 depicts an operation principle of the optical signal receiving apparatus according to the fifth embodiment in the case of the reception state (1)

FIG. 14 depicts an operation principle of the optical signal receiving apparatus according to the fifth embodiment in the case of the reception state (1). Signals b0, a1, b2, a3, b4 . . . from the multiplexing unit 1404 are put into the parallelizing unit 1405, and signals a1, b2, a3, b4 are put out of channels (ch) 1, 2, 3, 4 of the parallelizing unit 1405 respectively. This indicates a state where a 1 bit delay is not occurring.

The phase comparing circuit 1407 and the phase judging circuit 1408 compare a clock signal α put out of the clock recovering unit 1403 with a clock signal β put out of the parallelizing unit 140, and judge that the signal β shows no phase shift, then inform the receiving/processing unit 1406 of no shift of the phase of the clock signal β. In this case, the 1 bit delay unit 1406b does not execute a 1 bit delay process.

Figure 15:
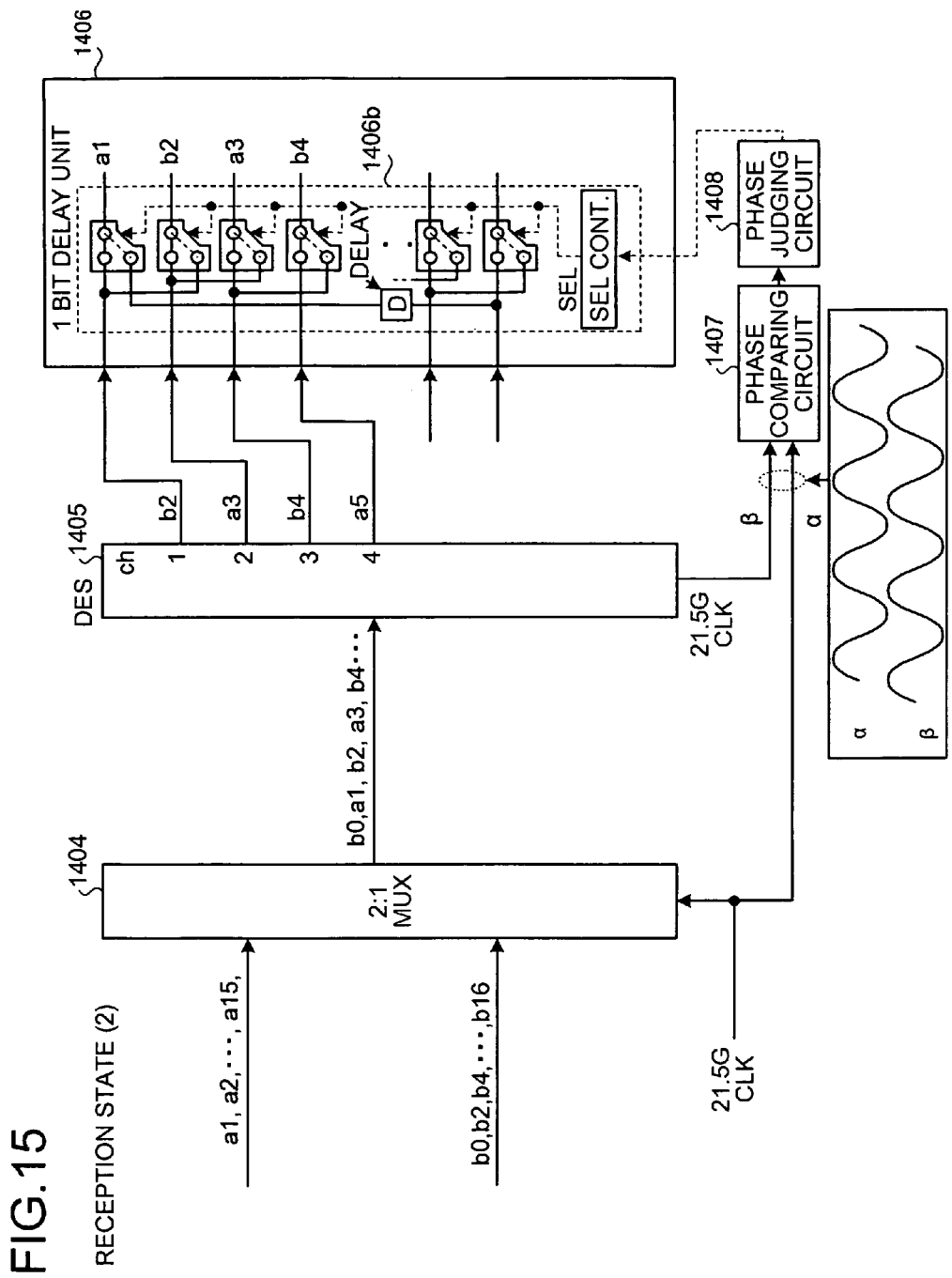
FIG. 15 depicts an operation principle of the optical signal receiving apparatus according to the fifth embodiment in the case of the reception state (2)

FIG. 15 depicts an operation principle of the optical signal receiving apparatus according to the fifth embodiment in the case of the reception state (2). Signals b0, a1, b2, a3, b4 . . . from the multiplexing unit 1404 are put into the parallelizing unit 1405, and signals b2, a3, b4, a5 are put out of the channels (ch) 1, 2, 3, 4 of the parallelizing unit 1405 respectively. This indicates a state where the 1 bit delay is occurring. In this case, the phase comparing circuit 1407 and the phase judging circuit 1408 compare the clock signal α with the clock signal β to give a judgment that the signal β shows a phase shift, and the phase judging circuit 1408 informs the receiving/processing unit 1406 of a shift of the phase of the clock signal β. In this case, the 1 bit delay unit 1406b of the receiving/processing unit 1406 executes the 1 bit delay process to correct the signals put out of the parallelizing unit 1405 into signals without 1 bit delay.

Figure 16:
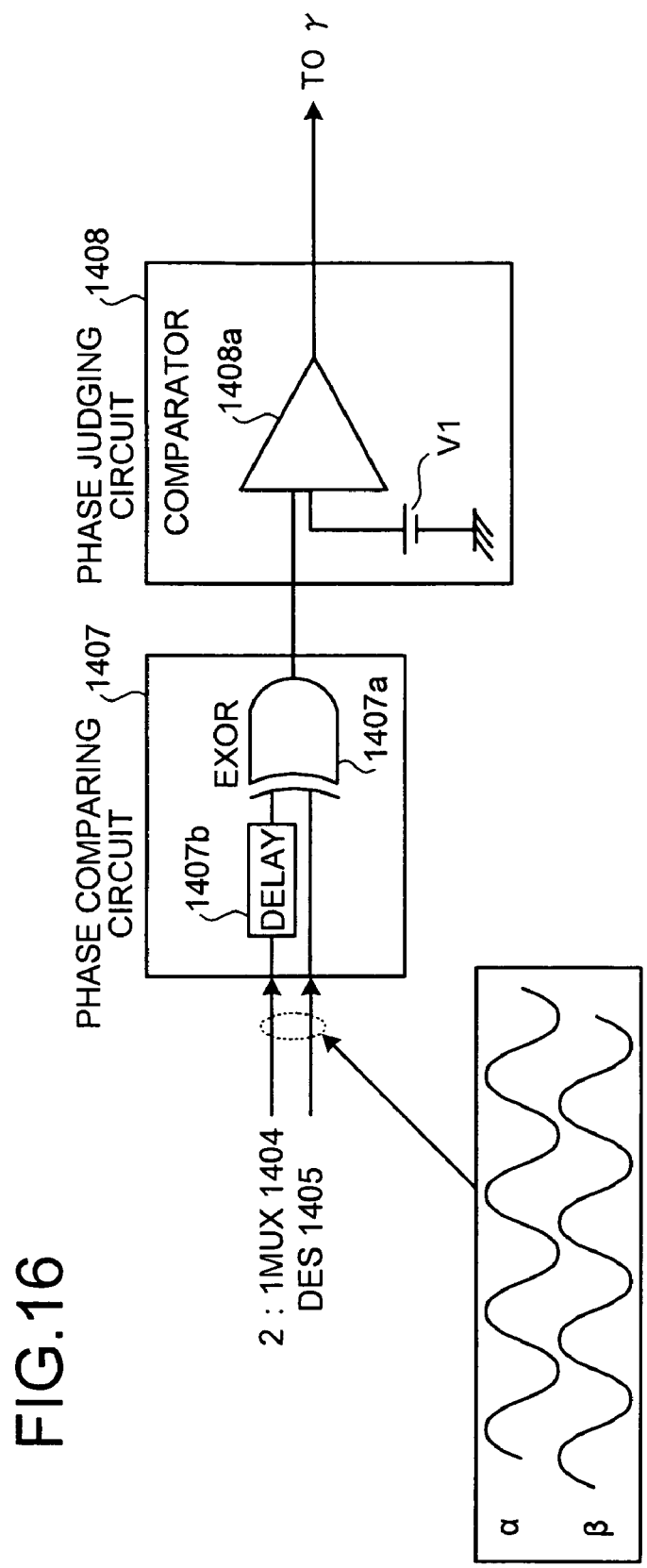
FIG. 16 depicts a phase comparing circuit and a phase judging circuit of the optical signal receiving apparatus according to the fifth embodiment.

FIG. 16 depicts the phase comparing circuit and the phase judging circuit of the optical signal receiving apparatus according to the fifth embodiment. The phase comparing circuit 1407 is composed of an exclusive-OR circuit (EXOR) 1407a, and a delay circuit 1407b. Receiving the clock signal α from the clock recovering unit 1403 and the clock signal β from the parallelizing unit 1405, the exclusive-OR circuit 1407a puts out a phase difference between the clock signals α, β in terms of power intensity. In the phase comparing circuit 1407, the delay circuit 1407b delays the clock signal α so that the phase difference becomes zero in the case of reception state (1).

Figure 17:
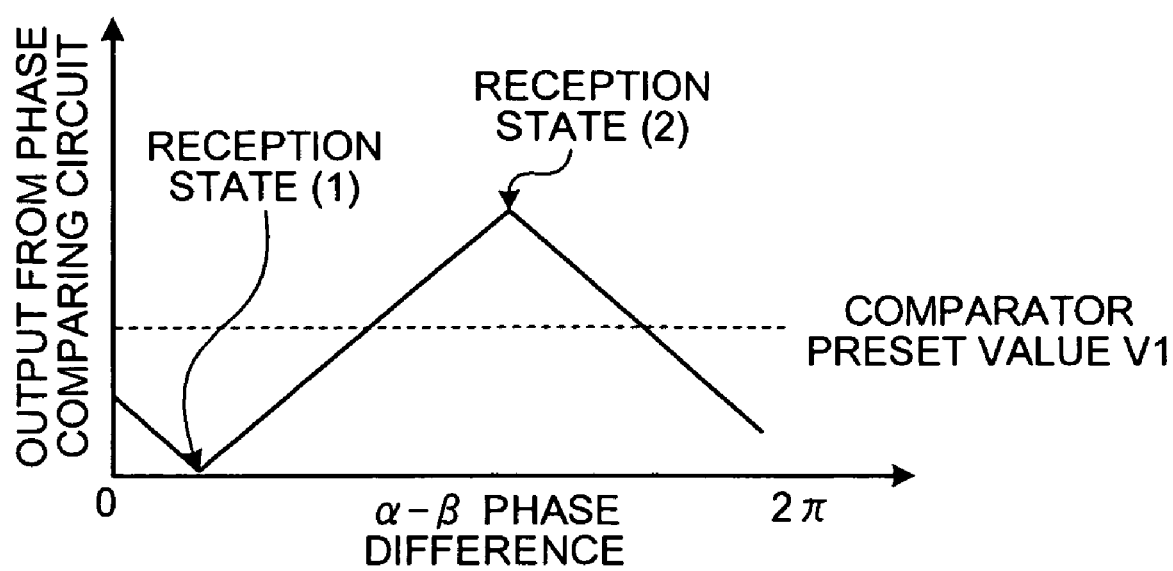
FIG. 17 is a graph showing relation between a phase difference and output from the phase comparing circuit.

FIG. 17 is a graph of the relation between a phase difference and output from the phase comparing circuit. Output from the phase comparing circuit 1407 becomes zero in the case of the reception state (1), and becomes a value exceeding a comparator preset value (V1), which is a prescribed threshold, in the case of the reception state (2). The phase judging circuit 1408 shown in FIG. 16 includes a comparator 1408a that informs the receiving/processing unit 1406 of the non-occurrence of a 1 bit delay when output from the phase comparing circuit 1407 exceeds the prescribed comparator preset value, and informs of the occurrence of the 1 bit delay when output from the phase comparing circuit 1407 is less than the prescribed comparator preset value.

An output value from the phase comparing circuit 1407 could be located near the comparator preset value in both cases of the reception states (1), (2). This situation does not allow judgment on a reception state using the comparator preset value. In this case, the delay circuit 1407b delays the clock signal a, as described above, to make such adjustment that output values from the phase comparing circuit are located across the comparator preset value in response to the cases of the reception states (1), (2). Judgment on whether being in the reception state (1) or in the reception state (2) using the phase comparing circuit 1407 and the phase judging circuit 1408 can be executed as a process entirely handled by hardware.

According to the optical signal receiving apparatus of the first embodiment, the reception state recognizing circuit 26 cannot recognize a signal reception state as the reception state (1) or as the reception state (2) in discrimination because either reception state (1) or (2) results even if an incoming signal matches to the same comparison pattern, as shown in FIG. 3. Because of this, the optical signal receiving apparatus of the first embodiment carries out the recognition of the reception state (1) or (2) by causing the frame synchronizing circuit 25 to try to establish frame signal synchronization over the entire data to judge on whether synchronization can be established, using a CPU in a software-based process. After the recognition of the reception state, the 1 bit delay circuit 22 is controlled to execute the 1 bit delay process.

In contrast, according to the optical signal receiving apparatus 1400 of the fifth embodiment, the phase comparing circuit 1407 and the phase judging circuit 1408 recognize the reception state (1) or (2) in discrimination. As a result, judgment on being in the reception state (1) or in the reception state (2) can be made on hardware, for example, at the initial startup, or even if data input to the optical signal receiving apparatus 1400 is lost temporarily due to switchover by an optical switch, etc. This enables fast restart or initial startup of the receiving/processing unit 1406.

Figure 18:
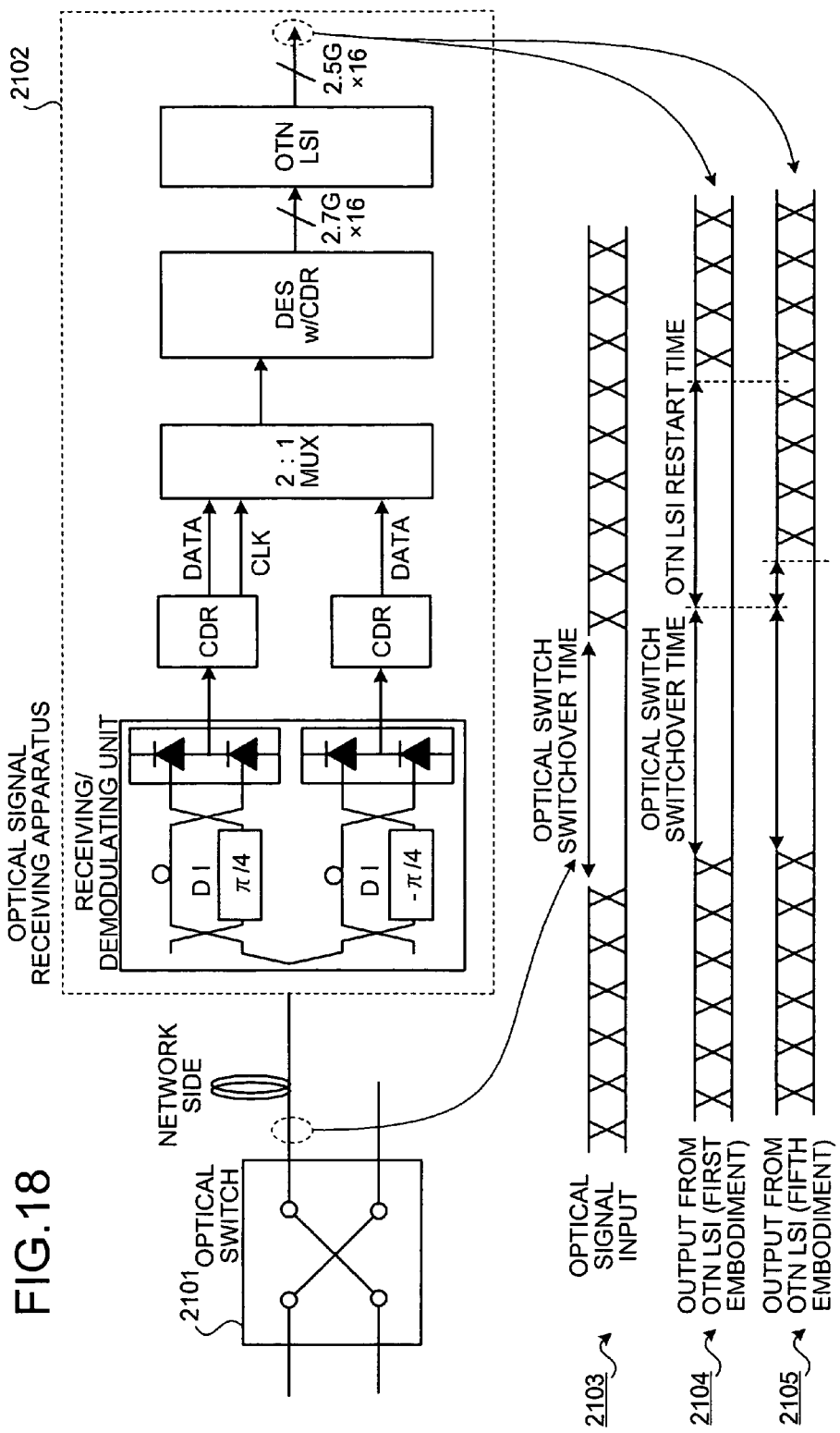
FIG. 18 depicts operation of the optical signal receiving apparatus when switchover by an optical switch is carried out.

FIG. 18 depicts operation of the optical signal receiving apparatus when switchover by an optical switch is carried out. 2101 denotes an optical switch (SW), and 2102 denotes the optical signal receiving apparatus of the first embodiment or the fifth embodiment. 2103 denotes an optical input signal sent from the optical switch 2101 into the optical signal receiving apparatus 2102. 2104 denotes an optical input signal put out of the receiving/processing unit 9 of the optical signal receiving apparatus 2102 according to the first embodiment. 2105 denotes an optical input signal put out of the receiving/processing unit 1406 (see FIG. 11) of the optical signal receiving apparatus 1400 according to the fifth embodiment.

As shown in FIG. 18, when switchover by the optical switch 2101 occurs, a portion of the optical input signal 2103 corresponding to a switchover time disappears. In response to this, in the optical signal receiving apparatus according to the first embodiment, the frame synchronizing circuit 25 tries to establish frame signal synchronization over the entire data to judge whether synchronization can be established, thus the reception state (1) or (2) is recognized in discrimination. After the recognition of the reception state, 1 bit delay control is executed to restart the receiving/processing unit 9. In contrast, in the optical signal receiving apparatus 1400 according to the fifth embodiment, judgment on being in the reception state (1) or in the reception state (2) and 1 bit delay control are carried out on hardware at high speed to restart the receiving/processing unit 1406. This remarkably reduces a time to restart receiving/processing unit 1406.

Figure 19:
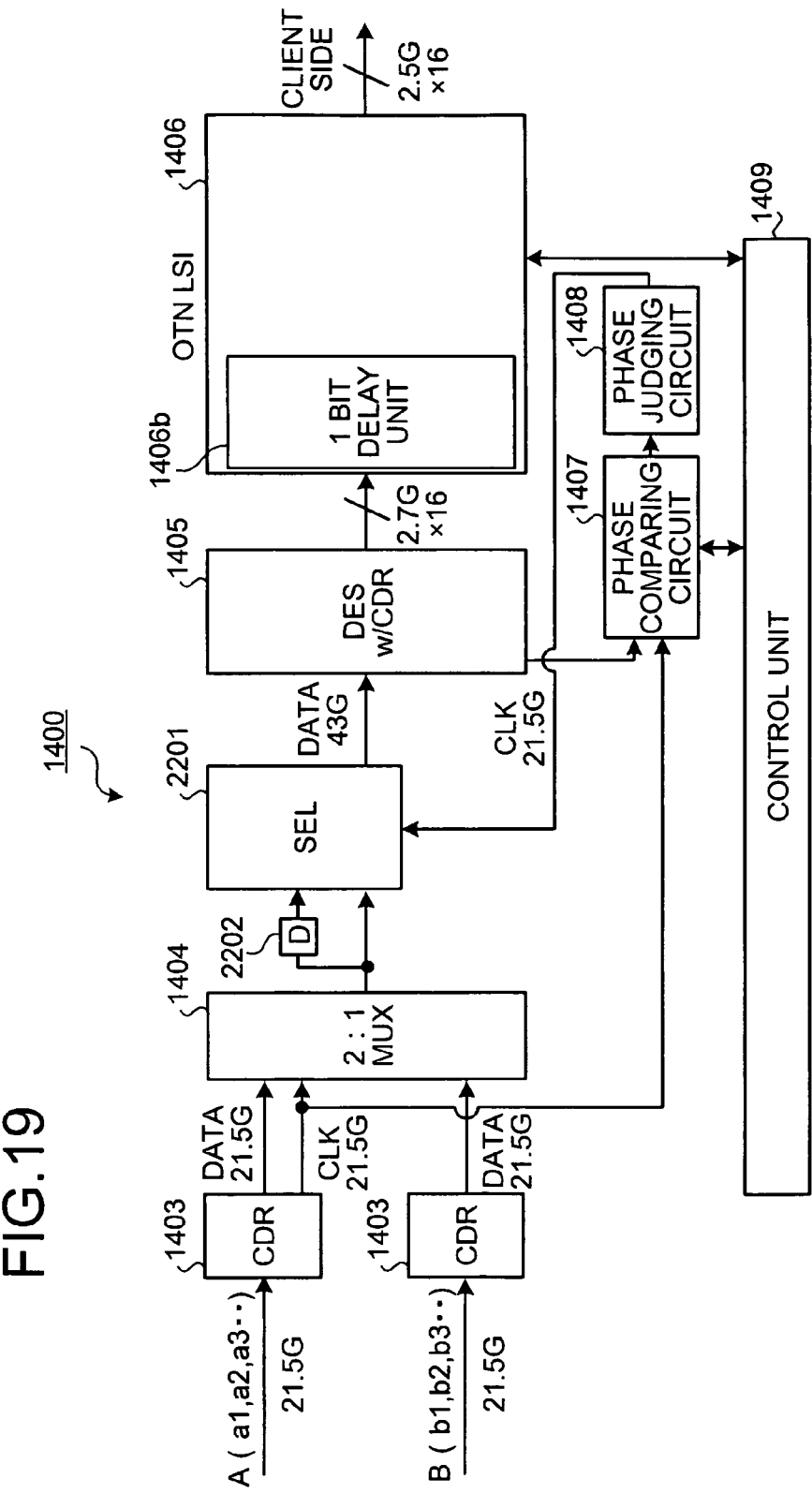
FIG. 19 is a block diagram of a first modification in which modification is applied partially in the optical signal receiving apparatus according to the fifth embodiment.

FIG. 19 is a block diagram of a partial modification example 1 of the structure of the optical signal receiving apparatus according to the fifth embodiment. The same components as components shown in FIG. 11 are denoted by the same reference numerals to omit repeated descriptions. The optical signal receiving apparatus 1400 according to the modification example 1 is provided with a selecting unit (SEL) 2201 between the multiplexing unit 1404 and the parallelizing unit 1405. An output signal from the multiplexing unit 1404 is divided into two signals, which are then put into the selecting unit 2201. One of two input paths leading to the selecting unit 2201 is provided with a 1 bit delay circuit (D: Delay) 2202. One of the two input signals is delayed by one bit as the signal passes through the 1 bit delay circuit 2202, and is put into the selecting unit 2201.

The phase judging circuit 1408 informs the selecting unit 2201 of a shift or no shift of the phase of the clock signal β output from the parallelizing unit 1405. The selecting unit 2201 selects a signal without one bit delay from the two input signals to send the selected signal to the parallelizing unit 1405 when receiving the information from the phase judging circuit 1408 that tells the phase of the clock signal β is not shifted. On the other hand, the selecting unit 2201 selects a signal with one bit delay from the two input signals to send the selected signal to the parallelizing unit 1405 when receiving the information from the phase judging circuit 1408 that tells the phase of the clock signal β is shifted.

This allows judgment on being in the reception state (1) or in the reception state (2) to be made on hardware, for example, at the initial startup, or even if data input to the optical signal receiving apparatus 1400 is lost temporarily due to switchover by an optical switch, etc. Thus, fast restart or initial startup of the receiving/processing unit 1406 becomes possible.

Figure 20:
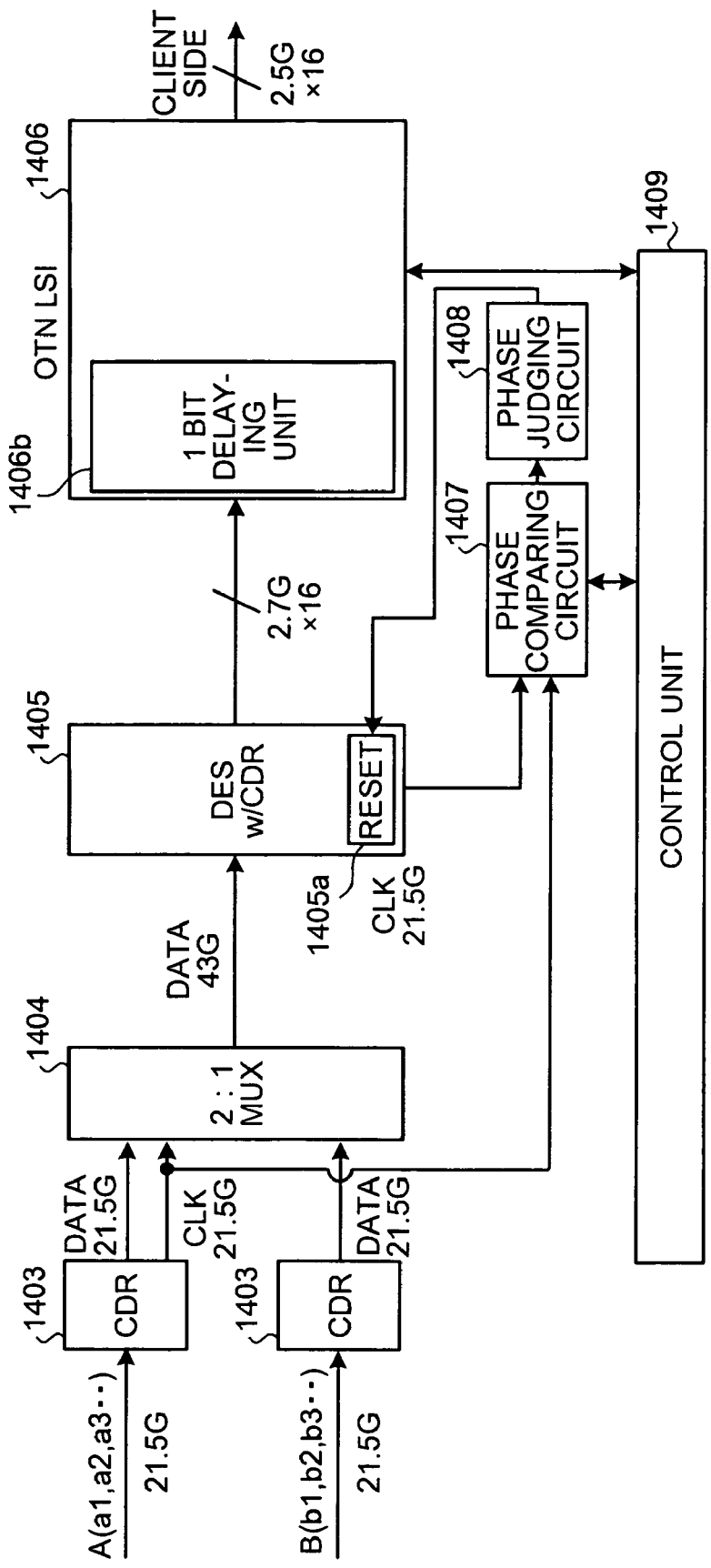
FIG. 20 is a block diagram of a second modification in which modification is applied partially in the optical signal receiving apparatus according to the fifth embodiment.

FIG. 20 is a block diagram of a partial modification example 2 of the structure of the optical signal receiving apparatus according to the fifth embodiment. The same components as components shown in FIG. 11 are denoted by the same reference numerals to omit repeated descriptions. The phase judging circuit 1408 of the optical signal receiving apparatus 1400 according to the modification example 2 informs a resetting unit 1405a incorporated into the parallelizing unit 1405 of a phase shift of the clock signal β put out of the parallelizing unit 1405 when the phase of the clock signal β is shifted. When the resetting unit 1405a receives information of the phase shift of the clock signal β, the parallelizing unit 1405 resets a synchronized state and restarts, and parallelizes output signals from the multiplexing unit 1404 again to send the parallelized signals to the receiving/processing unit 1406.

In this case, while either reception state (1) or reception state (2) results case by case, the phase judging unit 1408 keeps informing of a phase shift and the parallelizing unit 1405 keeps restarting until the reception state (1) results. This allows judgment on being in the reception state (1) or in the reception state (2) to be made on hardware, for example, at the initial startup, or even if data input to the optical signal receiving apparatus 1400 is lost temporarily due to switchover by an optical switch, etc. Thus, fast restart or initial startup of the receiving/processing unit 1406 becomes possible.

Figure 21:
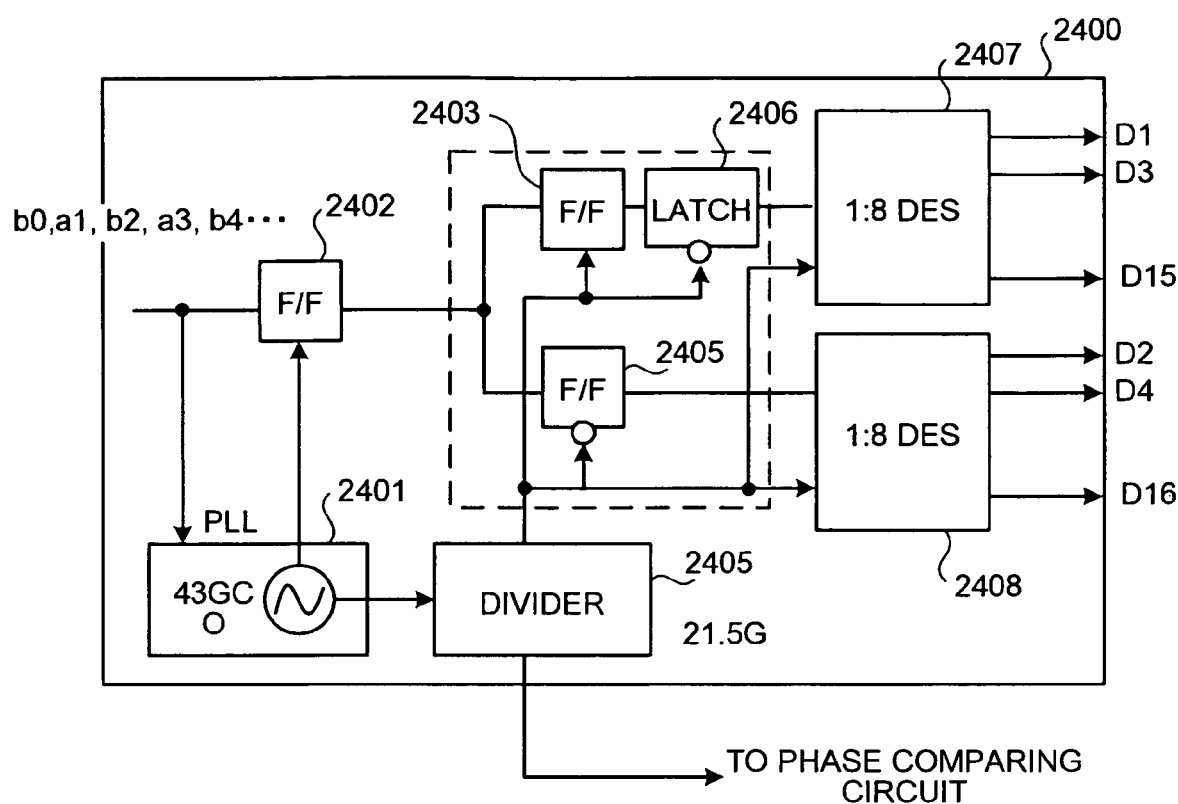
FIG. 21 is a block diagram of a modification of the internal structure of a parallelizing unit of the optical signal receiving apparatus according to the fifth embodiment.

FIG. 21 is a block diagram of a modification example of the internal structure of the parallelizing unit of the optical signal receiving apparatus according to the fifth embodiment. A parallelizing unit 2400 according to the modification example includes an oscillator (VCO) 2401, a flip-flop circuit (F/F) 2402, a flip-flop circuit 2403, a flip-flop circuit 2404, a divider 2405, a latch circuit (LATCH) 2406, a parallelizing circuit (1:8 DES) 2407, and a parallelizing circuit (1:8 DES) 2408.

The oscillator 2401 generates a clock signal of 43 GHz. The divider 2405 divides the 43 GHz clock signal in frequency to send a clock signal of 21.5 GHz to the phase comparing circuit 1407. In the same manner as the above parallelizing unit 1405 does, the parallelizing unit 2400 according to the modification example divides incoming signals b0, a1, b2, a3, b4 . . . from the modulating unit 1404 into odd signals and even signals, and puts the odd signals out of the parallelizing circuit 2407 and even signals out of the parallelizing circuit 2408.

Figure 22:
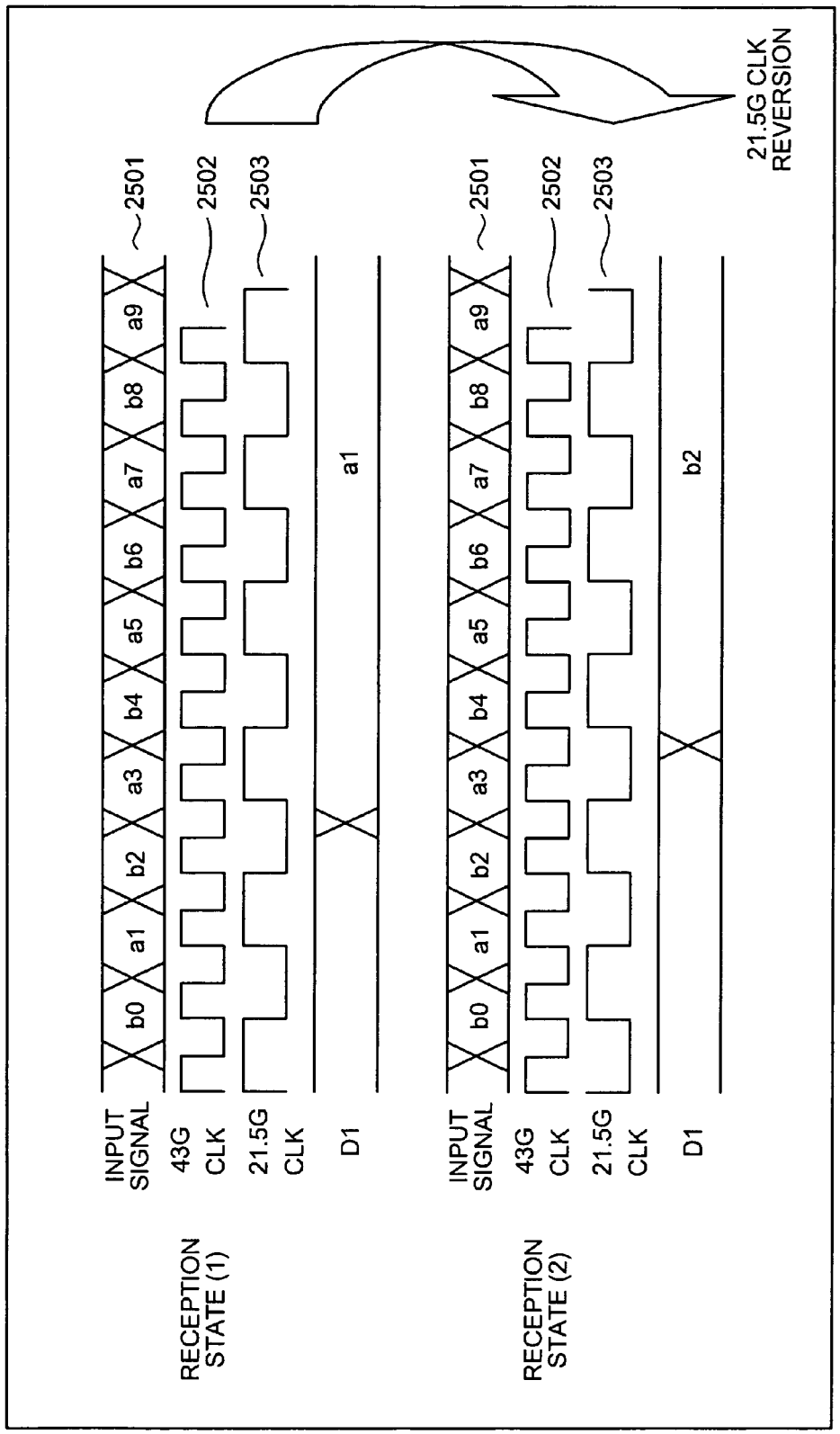
FIG. 22 depicts a clock signal from the parallelizing unit in the case of a reception state (1) and of a reception state (2)

FIG. 22 depicts a clock signal from the parallelizing unit in the case of the reception state (1) and of the reception state (2). In the case of the reception state (1), A-series input signals (a1, a3, . . . ) 2501 put out of the π/4 delay interferometer 1401a shown in FIG. 11 correspond to the raising edges of a clock signal (21.5 G CLK) 2503, which is given by dividing a clock signal (43 G CLK) from the oscillator 2401 of the parallelizing unit 2400 by the divider 2405. In the case of the reception state (2), the A-series input signals 2501 correspond to the reverse edges of the clock signal 2503.

As shown in FIG. 22, the phase of the clock signal 2503 put out of the divider 2405 of the parallelizing unit 2400 shifts by a half cycle between the reception state (1) and the reception state (2). In the case of the reception state (1), a signal a1 is put out from an output 1 (D1) of the parallelizing circuit 2407 shown in FIG. 21. In the case of the reception state (2), a signal b2 is put out from the output 1 (D1) of the parallelizing circuit 2407 shown in FIG. 21.

Figure 23:
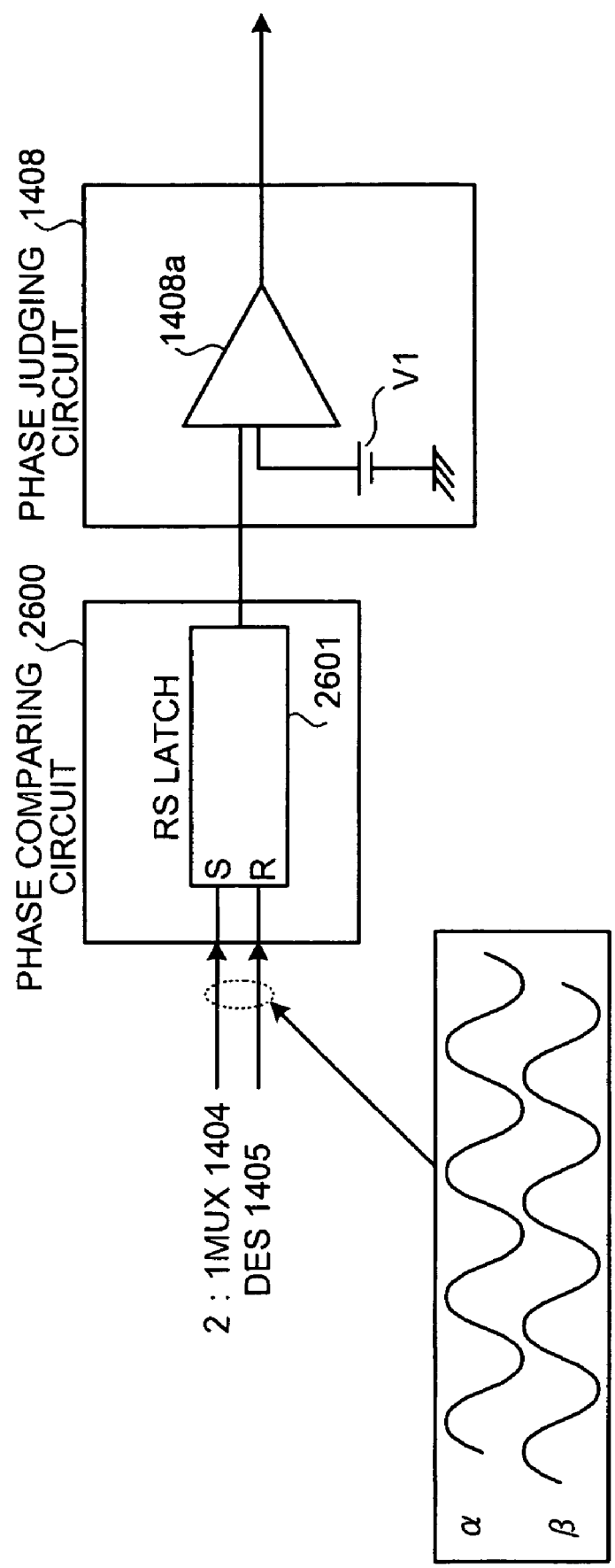
FIG. 23 is a block diagram of a modification of the phase comparing circuit of the optical signal receiving apparatus according to the fifth embodiment.
Figure 24:
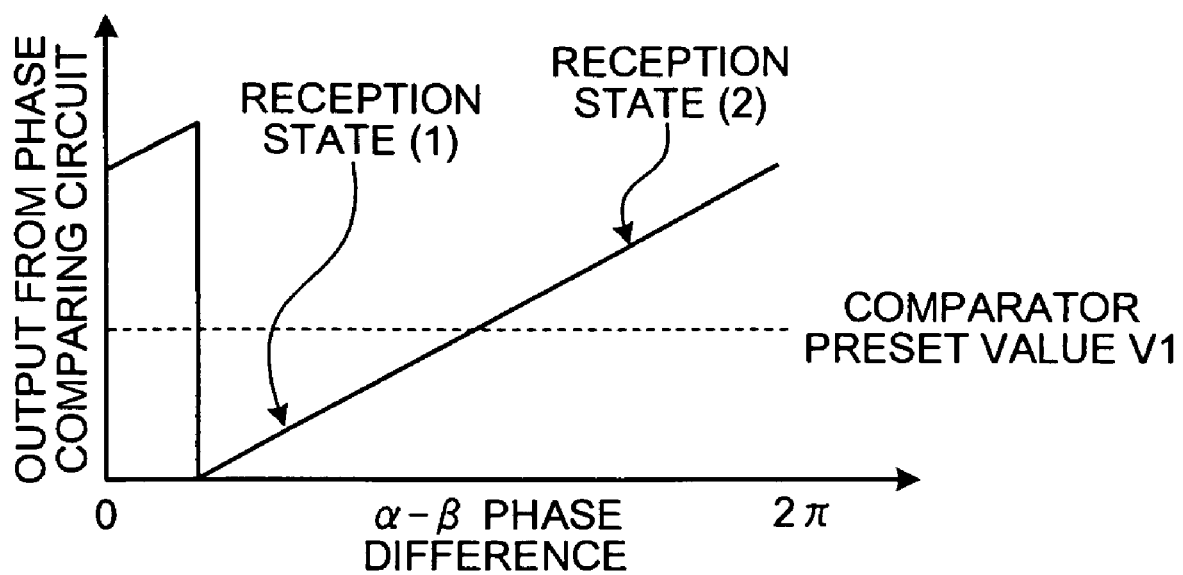
FIG. 24 is a graph showing the relation between output from the phase comparing circuit and a phase difference.
Figure 25:
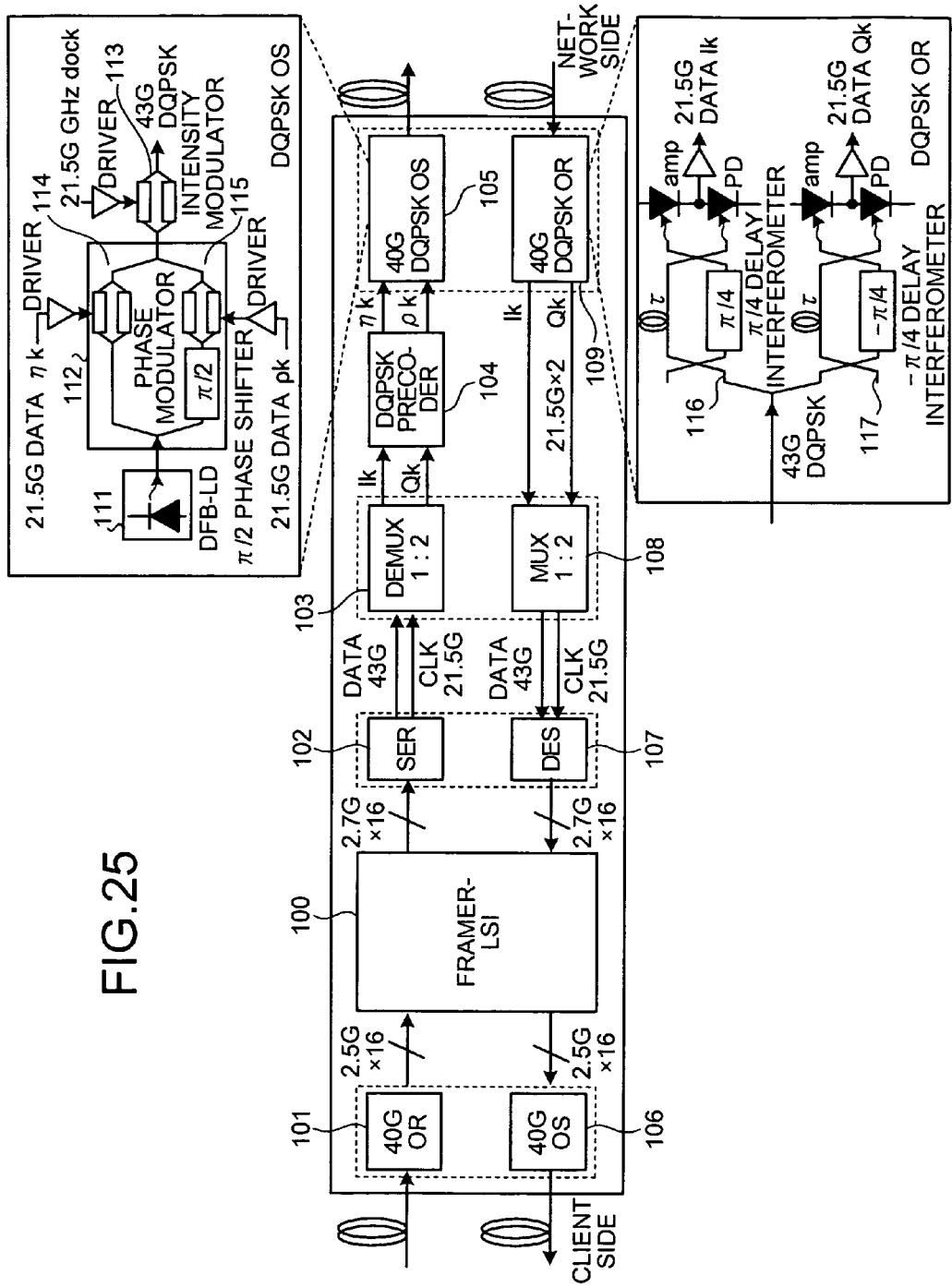
FIG. 25 is an explanatory diagram of a conventional optical signal transceiver.

FIG. 23 is a block diagram of a modification example of the phase comparing circuit of the optical signal receiving apparatus according to the fifth embodiment. A phase comparing circuit 2600 according to the modification example includes an RS Latch circuit 2601. FIG. 24 is a graph of the relation between output from the phase comparing circuit and a phase difference. As shown in FIG. 24, output from the phase comparing circuit 2600 becomes a constant value at a phase difference cycle of 2π. This allows constant judgment on the reception states (1), (2) using a comparator preset value, which eliminates a need of the delay circuit 1407b shown in FIG. 16. The phase judging circuit for the phase comparing circuit 2600 has the same structure as the phase judging circuit 1408 shown in FIG. 11, and, therefore, is not described further.

The above described optical signal receiving apparatus and optical signal reception control method offer such an effect that the reception state recognizing circuit recognizes a state of logic reversion and of a bit swap of a reception signal while the phase comparing circuit and the phase judging circuit recognize a state of bit delay of a reception signal, and that the logic reversing circuit, the bit swap circuit, or the 1 bit delay circuit operates in response to a variety of reception states of signals to automatically bring a desired reception state enabling synchronous frame capturing.

The device and method also offer such an effect that judgment on a bit delay state and a bit delay process is carried out on hardware to enable fast restart or initial startup of the receiving/processing unit.

As described above, the optical signal receiving apparatus and the optical signal reception control method according to the present invention are useful for data communication employing the IM-DQPSK method, and are particularly suitable for a case where restart of a receiving/processing device is required due to switchover of an optical switch, etc.

As described above, according to the embodiments described above, it is possible to control each logic process circuit to automatically provide a desired reception state enabling synchronous frame capturing. Moreover, fast restarting and initial startup of a receiving/processing unit is possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for receiving an optical signal that receives and demodulates an optical signal subjected to differential quadrature phase shift keying (DQPSK) modulation, the apparatus comprising:
    a demodulator that includes a plurality of delay interferometers and photoelectric conversion elements, the interferometers and the photoelectric conversion elements converting an in-phase signal and a quadrature signal of a DQPSK optical signal into electrical signals of each;
    a recovering unit that recovers a clock signal and data based on the electrical signals;
    a multiplexer that multiplexes the electrical signals from the recovering unit;
    a parallelizing unit that parallelizes the signals multiplexed by the multiplexer;
    a processor that performs a frame process including a frame synchronization process on the signals parallelized by the parallelizing unit; and
    a judging unit that judges whether a bit delay is present based on a phase difference between a phase of the clock signal at the recovering unit and a phase of the clock signal at the parallelizing unit, wherein
    the processor includes a logic processing circuit that executes a bit delay process according to a result of judgment by the judging unit, wherein the judging unit includes
    a phase comparing circuit that outputs a phase difference between a phase of the clock signal at the recovering unit and a phase of the clock signal at the parallelizing unit; and
    a phase judging circuit that judges whether the phase difference is larger than a threshold.

2. The optical signal receiving apparatus according to claim 1, wherein the processor includes
    a frame synchronizing circuit that establishes frame synchronization;
    a state recognizing circuit that recognizes a reception state based on the parallelized signals; and
    a logic processing circuit that executes a logic reversion process, a bit delay process, and a bit swap process corresponding to a reception state other than a desired reception state recognized by the state recognizing circuit and to the result of judgment by the judging unit.

3. The optical signal receiving apparatus according to claim 2, wherein the logic processing circuit includes
    a logic reversing circuit that executes logic reversion on the parallelized signals based on the reception state recognized by the state recognizing circuit;
    a bit delay circuit that includes a selector and a delay circuit, and that causes a bit delay on the parallelized signals based on the result of judgment by the judging unit; and
    a bit swap circuit that includes a switching circuit that executes bit swap between the parallelized signals of adjacent channels.

4. The optical signal receiving apparatus according to claim 3, further comprising a controller that controls at least one of the logic reversing circuit and the bit swap circuit corresponding to the reception state other than the desired reception state, and that controls the bit delay circuit based on the result of judgment by the judging unit, wherein
    the state recognizing circuit recognizes the reception state by comparing a frame synchronization pattern of the parallelized signal with a comparison pattern for reception states.

5. The optical signal receiving apparatus of claim 3, further comprising a controller that controls at least one of the logic reversing circuit and the bit swap circuit based on the reception state, and that controls the bit delay circuit based on the result of judgment by the judging unit, wherein
    the demodulator is configured to be capable of maintaining a phase difference between a $\pi/4$ delay interferometer and a $-\pi/4$ delay interferometer at $\pi/2$, and
    the state recognizing circuit recognizes the reception state by comparing a frame synchronization pattern of the parallelized signal with a comparison pattern having eight patterns corresponding to reception states including the desirable reception state.

6. The optical signal receiving apparatus according to claim 3, further comprising a controller that controls at least one of the logic reversing circuit and the bit swap circuit based on the reception state, and that controls the bit delay circuit based on the result of judgment by the judging unit, wherein
    the optical signal is transmitted from a transmitting device that is configured to be capable of transmitting the optical signal while maintaining a phase difference between an in-phase signal and a quadrature signal of the optical signal within either one of ranges of $\pi/2\pm2n\pi$ and $-\pi/2\pm2n\pi$, where n represents a positive integer, and
    the demodulator is configured to be capable of maintaining a phase difference between a $\pi/4$ delay interferometer and a $-\pi/4$ delay interferometer at $\pi/2$, and
    the state recognizing circuit recognizes the reception state by comparing a frame synchronization pattern of the multiplexed signal with a comparison pattern having four patterns corresponding to reception states including the desirable reception state.

7. The optical signal receiving apparatus according to claim 1, wherein the phase comparing circuit is constituted by an exclusive OR circuit.

8. The optical signal receiving apparatus according to claim 1, wherein the phase comparing circuit is constituted by an RS latch circuit.

9. The optical signal receiving apparatus according to claim 2, wherein
    the logic processing circuit includes
    a logic reversing circuit that executes logic reversion on the parallelized signals based on the reception state recognized by the state recognizing circuit;
    a bit delay circuit that is arranged between the multiplexer and the parallelizing unit, that includes a selector and a delay circuit, and that causes a bit delay on the multiplexed signals based on the result of judgment by the judging unit; and a bit swap circuit that includes a switching circuit that executes bit swap between the parallelized signals of adjacent channels, and the judging unit inputs the result of judgment to the bit delay circuit.

10. The optical signal receiving apparatus according to claim 1, wherein the parallelizing unit receives the result of judgment from the judging unit, and when the parallelizing unit receives a judgment indicating presence of the bit delay, keeps resetting a state of synchronization until a result indicating non-presence of the bit delay.

11. The optical signal receiving apparatus according to claim 1, wherein the parallelizing unit includes a divider unit that frequency-divides the clock signal, and the judging unit judges whether a bit delay is present based on a phase difference between a phase of the clock signal at the clock recovering unit and a phase of the clock signal frequency-divided by the divider unit.

12. A control method of receiving and demodulating an optical signal subjected to DQPSK modulation, the method comprising:

receiving the optical signal;

converting an in-phase signal and a quadrature signal of the optical signal into electrical signals of each;

recovering a clock signal and data based on the electrical signals by a recovering unit;

multiplexing the electrical signals from the recovering unit;

parallelizing the multiplexed signals by a parallelizing unit;

judging whether a bit delay is present based on a phase difference between a phase of the clock signal at the recovering unit and a phase of the clock signal at the parallelizing unit; and recognizing a reception state by comparing the parallelized signals with comparison patterns;

performing any one of a logic reversion process, a bit delay process, and a bit swap process corresponding to a reception state other than a desired reception state based on a result of judgment at the judging, wherein one of the processes performed is repeated until frame synchronization is established, and the judging is performed by a judging unit that includes a phase comparing circuit that outputs a phase difference between a phase of the clock signal at the recovering unit and a phase of the clock signal at the parallelizing unit; and a phase judging circuit that judges whether the phase difference is larger than a threshold.

13. The control method according to claim 12, wherein the recognizing includes recognizing the reception state by comparing frame synchronization patterns, any one of the logic reversion process and the bit swap process is performed corresponding to the reception state other than the desired reception state, and the bit delay process is performed when it is judged that the bit delay is present at the judging, and the process performed is repeated until frame synchronization is established.

* * * * *